US009798781B2

(12) United States Patent
Apps et al.

(10) Patent No.: US 9,798,781 B2
(45) Date of Patent: Oct. 24, 2017

(54) STRATEGY TREES FOR DATA MINING

(75) Inventors: Eric Apps, Toronto (CA); Ken Ono, King (CA)

(73) Assignee: ANGOSS SOFTWARE CORPORATION, Toronto (CA)

(*) Notice: Subject to any disclaimer, the term of this patent is extended or adjusted under 35 U.S.C. 154(b) by 1057 days.

(21) Appl. No.: 11/585,923

(22) Filed: Oct. 25, 2006

(65) Prior Publication Data
US 2007/0094060 A1 Apr. 26, 2007

Related U.S. Application Data

(60) Provisional application No. 60/729,736, filed on Oct. 25, 2005.

(51) Int. Cl.
G06F 17/30 (2006.01)
G06Q 10/00 (2012.01)
G06Q 10/06 (2012.01)
G06Q 30/02 (2012.01)

(52) U.S. Cl.
CPC .. *G06F 17/30539* (2013.01); *G06F 17/30398* (2013.01); *G06Q 10/00* (2013.01); *G06Q 10/0637* (2013.01); *G06Q 30/02* (2013.01)

(58) Field of Classification Search
CPC .................................................. G06Q 10/063
USPC ....................................................... 705/7.11
See application file for complete search history.

(56) References Cited

U.S. PATENT DOCUMENTS

| 4,975,975 A | 12/1990 | Filipski |
| 5,799,311 A * | 8/1998 | Agrawal ........... G06F 17/30625 |
| 6,014,661 A * | 1/2000 | Ahlberg et al. |
| 6,182,058 B1 | 1/2001 | Kohavi |
| 6,240,411 B1 * | 5/2001 | Thearling |
| 6,278,464 B1 * | 8/2001 | Kohavi et al. ................ 345/440 |

(Continued)

FOREIGN PATENT DOCUMENTS

WO 2005/043331 A2 5/2005

OTHER PUBLICATIONS

Waybackmachine screenshot for www.angoss.com.*
(Continued)

*Primary Examiner* — Susanna M Meinecke Diaz
(74) *Attorney, Agent, or Firm* — GOWLING WLG (CANADA) LLP

(57) ABSTRACT

A method for applying a strategy to a dataset in a data mining system to address a business problem, comprising: receiving at least one conditional expression defining the strategy from a user through a graphical user interface ("GUI") displayed on a display screen of the data mining system; applying the conditional expression to the dataset to split the dataset into segments; displaying the segments as nodes in a tree structure on the display screen; receiving a calculation expression for operating on one or more values in one or more of the segments; applying the calculation expression to one or more of the segments to generate one or more respective calculated values; displaying the one or more calculated values in respective nodes of the tree structure; receiving a treatment expression for operating on the calculated values; applying the treatment expression to one or more of the calculated values to generate respective responses to the business problem; and, displaying the responses in respective nodes of the tree structure to thereby address the business problem.

30 Claims, 13 Drawing Sheets

(56) References Cited

U.S. PATENT DOCUMENTS

| | | | |
|---|---|---|---|
| 6,278,997 B1 | 8/2001 | Agrawal et al. | |
| 6,324,533 B1* | 11/2001 | Agrawal et al. | |
| 6,330,563 B1* | 12/2001 | Heckerman et al. | |
| 6,470,335 B1* | 10/2002 | Marusak | |
| 6,532,467 B1* | 3/2003 | Brocklebank | G06K 9/6253 |
| 6,567,814 B1 | 5/2003 | Bankier et al. | |
| 6,609,120 B1* | 8/2003 | Honarvar et al. | |
| 6,636,860 B2* | 10/2003 | Vishnubhotla | 707/600 |
| 6,640,221 B1* | 10/2003 | Levine et al. | |
| 6,662,189 B2* | 12/2003 | Oyanagi et al. | |
| 6,677,963 B1* | 1/2004 | Mani et al. | 715/764 |
| 6,785,668 B1* | 8/2004 | Polo et al. | 707/771 |
| 6,868,412 B2* | 3/2005 | Gatehouse et al. | 706/62 |
| 6,868,525 B1 | 3/2005 | Szabo | |
| 6,941,318 B1* | 9/2005 | Tamayo et al. | 707/778 |
| 6,965,889 B2* | 11/2005 | Serrano-Morales et al. | 706/47 |
| 6,970,882 B2* | 11/2005 | Yao et al. | |
| 7,015,911 B2* | 3/2006 | Shaughnessy et al. | 345/440 |
| 7,117,208 B2* | 10/2006 | Tamayo et al. | 707/777 |
| 7,133,811 B2* | 11/2006 | Thiesson et al. | 703/2 |
| 7,225,200 B2 | 5/2007 | Chickering et al. | |
| 7,231,612 B1* | 6/2007 | Mani et al. | 715/841 |
| 7,315,861 B2* | 1/2008 | Seibel et al. | |
| 7,328,218 B2 | 2/2008 | Steinberg et al. | |
| 7,418,430 B2* | 8/2008 | Thiesson et al. | 706/12 |
| 7,499,897 B2 | 3/2009 | Pinto et al. | |
| 7,523,106 B2* | 4/2009 | Russell et al. | |
| 7,542,960 B2* | 6/2009 | Basak et al. | 706/52 |
| 7,644,094 B2* | 1/2010 | Heckerman | 707/999.101 |
| 7,756,804 B2* | 7/2010 | Bloom et al. | 706/46 |
| 7,818,347 B2 | 10/2010 | Dettinger et al. | |
| 8,046,271 B2 | 10/2011 | Jimenez et al. | |
| 2001/0051934 A1* | 12/2001 | Oyanagi | G06F 17/30961 706/12 |
| 2002/0059191 A1* | 5/2002 | Tamura | 707/2 |
| 2002/0107842 A1* | 8/2002 | Biebesheimer et al. | 707/3 |
| 2003/0037016 A1 | 2/2003 | Vilalta et al. | |
| 2003/0065635 A1* | 4/2003 | Sahami et al. | 706/48 |
| 2003/0145310 A1* | 7/2003 | Thames et al. | 717/123 |
| 2004/0181457 A1* | 9/2004 | Biebesheimer et al. | 705/26 |
| 2005/0102292 A1* | 5/2005 | Tamayo et al. | 707/10 |
| 2005/0154687 A1 | 7/2005 | Kraiss | |
| 2005/0160055 A1* | 7/2005 | Boulle | 706/12 |
| 2007/0055619 A1* | 3/2007 | Abrahams et al. | 705/38 |

OTHER PUBLICATIONS

AnswerTree Brochure. (2001). SPSS.*
Angoss DataMining Brochure. Jul. 2002. pp. 1-4.*
Comeau B (2001). Angoss Grows Decision Trees for Bell Canada. Information Management Magazine. pp. 1-3.*
AnswerTree 2.0 User's Guide (1998). SPSS Inc. pp. 1-203.*
Angoss Software Corporation: KnowledgeSTUDIO 3.0 Beta Data Mining Workbench Available Jan. 31, 2000 (2000) Business Wire Jan. 24, 2000. pp. 1-4.*
Clementine 8.0 (2003). SPSS. pp. 1-10.*
Angoss Announces Availability of KnowledgeSTUDIO for Siebel. Business Wire, Jan. 17, 2000. pp. 1-3.*
Collier K, Carey B, Sautter D and Marjaniemi C (1999). A Methodology for Evaluating and Selecting Data Mining Software. Proceedings of the 32nd Hawaii International Conference on System Sciences—1999. pp. 1-11.*
Walter Alberto Aldana. Thesis: Data Mining Industry: Emerging Trends and New Opportunities. MIT, 2000. pp. 1-182.*
Data Mining Products. Aug. 2002. pp. 1-16.*
Data Mining Tools (2004). META Group. pp. 1-3.*
Reffat RM, Gero JS and Peng W (2004). Using data mining on building maintenance during the building life cycle, Proceedings of the 38th Australian & New Zealand Architectural Science Association (ANZASCA) Conference, School of Architecture, University of Tasmania, Tasmania, Australia, pp. 91-97.*
Siebel System Requirements & Supported Platforms for Siebel Analytics Version 7.7, Rev. B Jul. 2004. pp. 1-26.*
Microsoft and Leading Data Mining Vendors Line Up in Support of Data Mining Specification OLE DB for Data Mining Beta Now Broadly Available (2000). Press Release Waggener Edstrom Worldwide. pp. 1-3.*
Tang Zu and MacLennan (2005). Data Mining with SQL Server. Wiley Publishing. pp. 1-483.*
Thearlin K (2003). An Introduction to Data Mining. pp. 1-47.*
Kimani S, Lodi S, Catarci T, Santucci G and Sartori C (2004). VidaMine: a visual data mining environment. Journal of Visual Languages. 15: 37-67.*
KnowledgeSTUDIO and KnowledgeSERVER White Paper version 4 (2002). Angoss Software Corporation. pp. 1-17.*
Michael Goebel and Le Gruenwald. 1999. A survey of data mining and knowledge discovery software tools. SIGKDD Explor. Newsl. 1, 1 (Jun. 1999), 20-33. DOI=10.1145/846170.846172 http://doi.acm.org/10.1145/846170.846172.*
KnowledgeStudio White Paper. Version 4.0. Jun. 11, 2002. pp. 1-17. http://www.comsol.ch/comsol/pub/media/pdf/Angoss %20KnowledgeSTUDIOWhitePaper.pdf.*
Segall RS (2004). Some Applications of Angoss Knowledge-Seeker IV and SAS Enterprise Miner for Course Instruction on Data Mining of Data Warehouses. 1-6. www.sbaer.uca.edu/research/swdsi../2003/Papers/004.pdf http://www.sbaer.uca.edu/research/swdsi../2003/Papers/004.pdf.*
M. M. Owrang O, F.H. Grupeb (1997). Database tools to acquire knowledge for rule-based expert systems. Information and Software Technology 39: 607-616.*
Angoss Software Deploys KnowledgeSeeker 5.0 Analysis Tool. High Beam Research. Productivity Software. Aug. 1, 2005. 1-3.*
Messier, et al. "Inducing Rules for Expert System Development: An Example Using Default and Bankruptcy Data." Management Sciences, vol. 34, No. 12 (Dec. 1998), pp. 1403-1415.*
Microsoft Business Solutions, "Business Portal—Key Performance Indicators", Brochure, 2003.
Muenchen, "Data Mining Jargon", The Statistical Consulting Centre, Feb. 9, 2003.
Junping et al., "Data Mining on Patent Data", International Conference on Neural Networks and Brain, 2005, Oct. 13-15, 2005, vol. 1, pp. 84-87.
Castellanos et al., "iBOM: A Platform for Intelligent Business Operation Management", Proceedings of the 21st International Conf. on Data Eng. (ICDE 2005), Apr. 5-8, 2005.
Roger, "An Introduction to Classification and Regression Tree (CART) Analysis", Annual Meeting of the Society for Academic Emergency Medicine, San Francisco, CA, 2000.
Padraic, "Decision Trees for Predictive Modeling", SAS Institute Inc., Aug. 4, 1999.
European Patent Office, Examination Report mailed Mar. 22, 2013 for corresponding European Patent Application No. 06790883.0.
European Patent Office, Extended European Search Report for European Patent Application No. 06790883.0, Mailed March 18, 2011.
Apte, et al., "Data Mining With Decision Trees and Decision Rules", Future Generation Computer Systems, vol. 13, pp. 197-210, 1997.
Salford Systems, "Intro . . . Introducing CART 5", CART 5 Software Product Documentation, 2003.
James Guszcza, "CART from A to B", CAS Predictive Modeling Seminar, Chicago, Sep. 2005.

* cited by examiner

STRATEGY TREES FOR DATA MINING

This application claims priority from U.S. Provisional Patent Application No. 60/729,736, filed Oct. 25, 2005, and incorporated herein by reference.

FIELD OF THE INVENTION

This invention relates to the field of data mining, and more specifically, to data mining using strategy trees.

BACKGROUND OF THE INVENTION

Existing data mining systems and methods such as decision trees, multidimensional data sources, and data mining work flows have several limitations.

In particular, decision trees are used for analysis of data structures to reveal relationships and patterns the purpose of which is to apply analytical techniques and statistical methods to reveal these relationships and patterns—expressed as models or scores. Analytical techniques and statistical methods consist for example of segmentation, classification, and estimation. There is generally a requirement for a dependent or target variable which defines the shape of the tree in commercial applications. Recent enhancements relate mostly to the improved performance of trees or their ability to create outputs for use in developing predictive models. Data analysis, as well as creation and deployment of rules, are typically limited by this construct/framework. For example, the amount of time required to create decision tables is extensive. In addition, multidimensional data sources such as cubes are have limitations with respect to output viewing (e.g., drill down, etc.). Furthermore, with respect to data mining work flows, database mining system users want to be able to better integrate scores (e.g., data mining predictive or cluster model outputs) with user defined metrics and rules within the same visual, interactive work environment. Segments are not directly and easily connected to cost, profit, and other business drivers. That is, the process of integrating modeling outputs with strategies is time consuming, manual, and error prone. Moreover, validation of segmentation strategies is time consuming and error prone. Finally, deploying data mining models and strategies is a difficult process typically involving time consuming manual programming steps.

A need therefore exists for improved data mining methods and systems. Accordingly, a solution that addresses, at least in part, the above and other shortcomings is desired.

SUMMARY OF THE INVENTION

According to one aspect of the invention, there is provided a method for applying a strategy to a dataset in a data mining system to address a business problem, comprising: receiving at least one conditional expression defining the strategy from a user through a graphical user interface ("GUI") displayed on a display screen of the data mining system; applying the conditional expression to the dataset to split the dataset into segments; displaying the segments as nodes in a tree structure on the display screen; receiving a calculation expression for operating on one or more values in one or more of the segments; applying the calculation expression to one or more of the segments to generate one or more respective calculated values; displaying the one or more calculated values in respective nodes of the tree structure; receiving a treatment expression for operating on the calculated values; applying the treatment expression to one or more of the calculated values to generate respective responses to the business problem; and, displaying the responses in respective nodes of the tree structure to thereby address the business problem.

In the above method, the one or more values may include outputs from data mining models. The conditional, calculation, and treatment expressions may include at least one of logical operators and mathematical operators. The conditional expression may be an IF-THEN-ELSE expression. The GUI may include a respective editor for defining each of the conditional, calculation, and treatment expressions. The method may further include verifying the strategy by applying the calculation expression to segments of a design dataset and a verified dataset to generate respective design calculated values and verified calculated values and displaying a comparison between the design and verified calculated values in respective nodes of the tree structure. The conditional expression may include an additional conditional expression for splitting one or more of the segments into one or more sub-segments, the calculation expression may be applied to one or more of the sub-segments to generate respective calculated values for the sub-segments, and the treatment expression may be applied to the calculated values for the sub-segments. The dataset may include one or more columns and the one or more values may be values in the one or more columns. The responses may be text messages. The tree structure may include a root node for the dataset and links between the root node and the one or more nodes, the links representing splitting of the dataset by the conditional expression to produce the segments. The method may further include deploying the strategy by providing one or more of the segments, calculated values, and responses to a client system coupled to the data mining system over a network in response to a request from the client system. The request may be a uniform resource locator ("URL") identifying one or more of the strategy and a customer attribute included in the dataset. The client system may display one or more of the responses on a display screen of the client system to thereby address the business problem for a customer associated with the customer attribute. The one or more of the segments, calculated values, and responses may be included in a document provided by the data mining system. The document may be a mark-up language document. The document may further include one or more of the conditional expression, the calculation expression, and the treatment expression. And, the method may further include accessing information required for determining the segments, calculated values, and responses using one or more of a customer attribute included in the request and a function of the customer attribute.

In accordance with further aspects of the present invention there is provided an apparatus such as a data processing system, a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and methods have not been described or shown in detail in order not to obscure the invention. The term "data processing system" is used herein to refer to any machine for processing data, including the client/server computer systems and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The invention may also be implemented by hardware.

Figure 1:
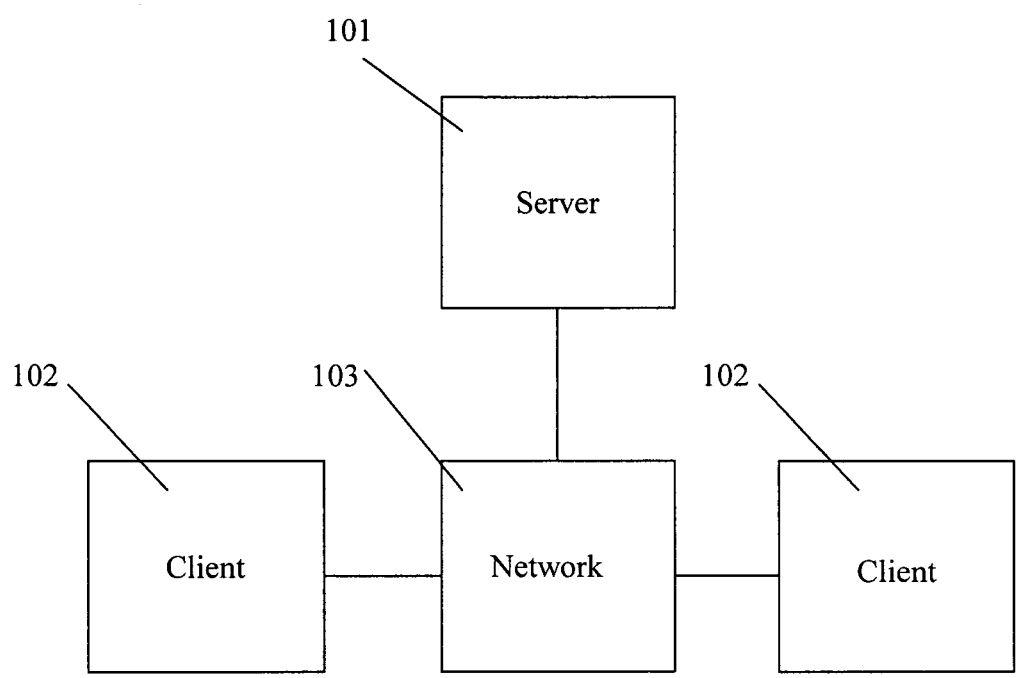
FIG. 1 is a block diagram illustrating a client/server system adapted to implement an embodiment of the invention.

FIG. 1 is a block diagram illustrating a client/server system 100 adapted to implement an embodiment of the invention. The client/server system 100 includes a server 101, which may be maintained by a service provider, communicating with one or more clients 102 over a network 103, such as the Internet.

Figure 2:
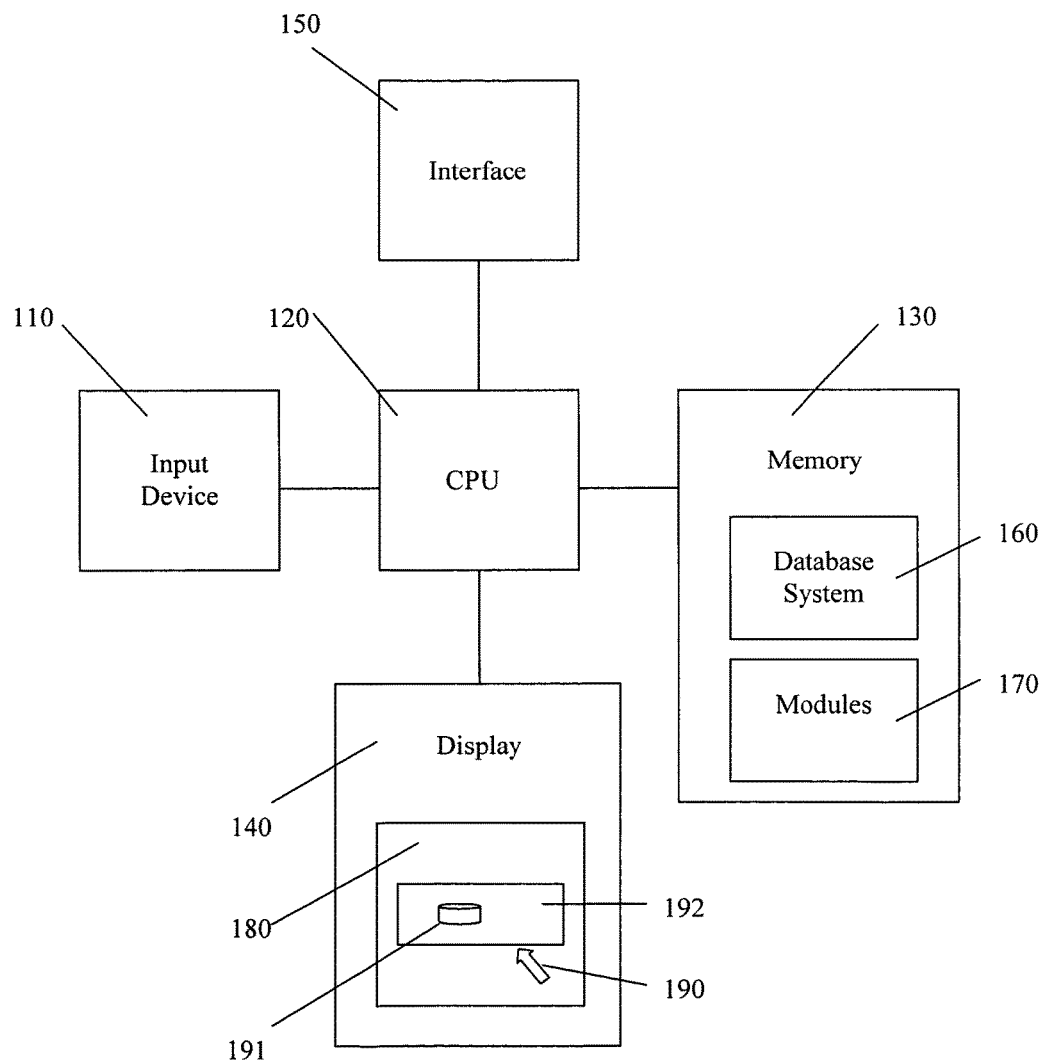
FIG. 2 is a block diagram illustrating a client and/or server system (i.e., a data processing system) adapted to implement an embodiment of the invention.

FIG. 2 is a block diagram illustrating a client and/or server system 101, 102 (i.e., a data processing system) adapted to implement an embodiment of the invention. Typically, each client 101 and server 102 (i.e., each data processing system) includes an input device 110, a central processing unit ("CPU") 120, memory 130, a display 140, and an interface device 150. The input device 110 may include a keyboard, a mouse, a trackball, or a similar device. The CPU 120 may include dedicated coprocessors and memory devices. The memory 130 may include RAM, ROM, databases, or disk devices. The display 140 may include a computer screen, terminal device, a hardcopy producing output device such as a printer or plotter, or a similar device. And, the interface device 150 may include a connection or interface to a network 103 such as the Internet. Thus, the data processing system 102, 103 may be linked to other data processing systems (e.g., 102, 103) by a network 103. The data processing system 102, 103 has stored therein data representing sequences of instructions which when executed cause the method described herein to be performed. Of course, the data processing system 102, 103 may contain additional software and hardware a description of which is not necessary for understanding the invention.

Thus, the data processing system 102, 103 includes computer executable programmed instructions for directing the system 102, 103 to implement the embodiments of the present invention. The programmed instructions may be embodied in one or more hardware or software modules 170 resident in the memory 130 of the data processing system 102, 103. Alternatively, the programmed instructions may be embodied on a computer readable medium (such as a CD disk or floppy disk) which may be used for transporting the programmed instructions to the memory 130 of the data processing system 102, 103. Alternatively, the programmed instructions may be embedded in a computer-readable, signal or signal-bearing medium that is uploaded to a network 103 by a vendor or supplier of the programmed instructions, and this signal or signal-bearing medium may be downloaded through an interface 150 to the data processing system 102, 103 from the network 103 by end users or potential buyers.

According to one embodiment, the server 101 includes a database system 160 for storing and accessing information for one or more clients 102 and provides transaction and content searching functionality. The server's database system 160 may include a database management system ("DBMS") coupled to a database and stored in the memory 130 of the server 101. It will be appreciated that the database system 160 may be shipped or installed without the database to or by end users. In general, the DBMS is adapted to read a query generated by the server 101 in response to a request for information generated by a client 102 and submitted over the network 103. The DBMS then executes the query against the database and provides a query result to the server 101 for presentation to the client user. It will be appreciated that the database system 160 may be stored in the memory 130 of the server 101 or stored in a distributed data processing system (not shown).

An example of a suitable DBMS is the DB2™ Universal Database Management System product sold by IBM™. The DBMS is a software layer interposed between the actual database (i.e. the data as stored for use by the CPU 120 of the server 101) and the users of the system. The DBMS is responsible for handling database transactions thus shielding users from the details of any specific computer hardware or database implementation. Using relational techniques, the DBMS stores, manipulates and retrieves data in the form of table-like relations typically defined by a set of columns or attributes of data types and a set of rows (i.e. records or tuples) of data. The standard database query language for dealing with relational databases implemented by most commercial DBMSs is the Structured Query Language ("SQL").

The server 101 includes a CPU 120 operatively coupled to memory 130 which also stores an operating system (not shown) for general management of the server system 101. An example of a suitable server system 101 is an IBM™ iSeries™ computer. The server 101 includes computer executable programmed instructions for directing the server 101 to implement the embodiments of the present invention. The programmed instructions may be embodied in one or more hardware or software modules 170 resident on the server 101. Alternatively, the programmed instructions may be embodied on a computer readable medium (such as a CD disk or floppy disk) which may be used for transporting the programmed instructions to the memory 130 of the server 101. Alternatively, the programmed instructions may be embedded in a computer-readable, signal or signal-bearing medium that is uploaded to a network 103 by a vendor or supplier of the programmed instructions, and this signal or signal-bearing medium may be downloaded to the server 101 from the network 103 by end users or potential buyers.

The CPU 120 of the server 101 is typically coupled to one or more devices 110, 140 for receiving user commands or queries and for presenting the results of these commands or queries to users locally or remotely via the network 103. User queries may be transformed into a combination of SQL commands for producing one or more tables of output data which may be incorporated in one or more documents, user interfaces, or Web pages for presentation to the user. The CPU 120 is coupled to memory 130 for containing programs and data such as base tables or virtual tables such as views or derived tables. As mentioned, the memory 130 may include a variety of storage devices including internal memory and external mass storage typically arranged in a hierarchy of storage as understood to those skilled in the art.

As will also be understood by those skilled in the art, the server 101 may include a number of separate servers depending on system 100 requirements. For example, the server 101 may include separate presentation, application, transaction, data, security, and communication servers.

According to one embodiment, each client 102 includes a CPU 120 operatively coupled to memory 130 which also stores an operating system (not shown) for general management of the client system 102. An example of a suitable client system 102 is an IBM™ ThinkPad™ computer. The client 102 includes computer executable programmed instructions for directing the client 102 to implement the embodiments of the present invention. The programmed instructions may be embodied in one or more hardware or software modules 170 resident on the client 102. Alternatively, the programmed instructions may be embodied on a computer readable medium (such as a CD disk or floppy disk) which may be used for transporting the programmed instructions to the memory 130 of the client 102. Alternatively, the programmed instructions may be embedded in a computer-readable, signal or signal-bearing medium that is uploaded to a network 103 by a vendor or supplier of the programmed instructions, and this signal or signal-bearing medium may be downloaded to the client 102 from the network 103 by end users or potential buyers.

The CPU 120 of the client 102 is typically coupled to one or more devices 110, 140 for receiving user commands or queries and for displaying the results of these commands or queries to the user on a display 140. Receiving and displaying user queries and results of queries is performed through a user interface typically presented to the user via a computer screen. The CPU 120 is coupled to memory 130 for containing programs and data. As mentioned, the memory 130 may include a variety of storage devices including internal memory and external mass storage typically arranged in a hierarchy of storage as understood to those skilled in the art. In addition, the client 102 may include a database system 160.

A user may interact with the client/server system 100, 101, 102 and its software modules 170 using a graphical user interface ("GUI") 180. GUIs are supported by common operating systems, such as IBM's OS/2™, and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Thus, in a GUI based system, a mouse 110 typically controls the position of a cursor icon 190 that is displayed on the display screen 140. The cursor 190 is moved by moving the mouse 110 over a flat surface, such as the top of a desk, in the desired direction of movement of the cursor 190. Thus, the two-dimensional movement of the mouse 110 on the flat surface translates into a corresponding two-dimensional movement of the cursor 190 on the display screen 140. Now, a mouse 110 typically has one or more finger actuated control buttons (i.e. mouse buttons). While the mouse buttons can be used for different functions such as selecting a menu option pointed at by the cursor 190, the disclosed invention may use a single mouse button to "select" an object and to trace the movement of the cursor 190 along a desired path. Specifically, to select an object 191, the cursor 190 is first located within the extent of the object 191 on the display 140. In other words, the cursor 190 is "pointed" at the object 191. Next, the mouse button is depressed and released. That is, the mouse button is "clicked". Selection is thus a point and click operation. To trace the movement of the cursor 190, the cursor 190 is located at the desired starting location, the mouse button is depressed to signal the CPU 120 to activate a function associated with the object 191, and the mouse 110 is moved while maintaining the button depressed. After the desired path has been traced, the mouse button is released. This procedure is often referred to as "clicking" and "dragging" (i.e. a click and drag operation). It will be understood that a predetermined key on a keyboard 110 could also be used to activate a mouse click or drag. In the following, the term "clicking" will refer to the depression of a mouse button indicating a selection by the user and the term "dragging" will refer to the subsequent motion of the mouse 110 and cursor 190 without the release of the mouse button.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Within an application window 192, windows are typically displayed in a similar manner and generally follow similar conventions for the arrangement of menus, style of dialog boxes, and use of the keyboard and mouse 110. The name of an application and any associated document, and a menu bar for the application are typically displayed at the top of the application window 192 which contains the running application. In addition, additional windows or panes may also be displayed. For example, a dialog box is a window that may be displayed to request information from the user or to supply information to the user.

Now, according to one embodiment of the invention there is a provided a strategy tree method for data mining applications. An overview of this method is provided below. Following this overview, a more detailed description of aspects of the method is provided.

The method may be implemented as an add-on strategy tree module 170 (e.g., "StrategyBUILDER™ by Angoss Software Corporation) for data mining systems 101, 102 (e.g., KnowledgeSTUDIO™ by Angoss Software Corporation) and is targeted at users who need to design optimal customer interaction strategies and rules. With the strategy tree module 170, users can manipulate a tree structure to determine node calculations and apply strategies based on those calculations. Common applications for credit risk departments are approval of new credit products or credit extensions, account management, collections, etc. In the marketing area, applications include direct marketing campaigns and determining appropriate product offerings. In this context, a "strategy" may be defined as a set of rules and actions that are developed to help achieve a business objective when interacting with a customer. The strategy tree module 170 uses a familiar tree structure to help define, develop, deploy, and verify strategies. With data mining systems such as KnowledgeSTUDIO™, analysts may develop a decision tree and export some of the segmentation and predictive results into other software programs to develop strategies. The strategy tree module 170 of the present invention improves the process and efficiency of data mining systems such as KnowledgeSTUDIO™. With the strategy tree module 170, all processes can be completed within one environment from data import, to data preparation and profiling, through to predictive modeling and strategy development and deployment. In addition, most data mining products stop once the score has been computed. This ignores the dynamic and complex task of acting on the model results in a specific business context to achieve optimal profitability. However, the strategy tree module 170 allows a user to formulate the necessary business rules and model cutoff points to take action. The strategy tree module 170 has the ability to interactively split a tree structure, with or without a dependent variable, on various data elements including scores and segments from data models, and then develop key performance indicators ("KPI") or node calculations for each segment (i.e., node of the tree). The KPI's are calculated metrics such as profit, write-offs, purchasing behaviour, etc. The purpose of creating the segments and each KPI is to then apply treatments or actions to undertake for each segment. These treatments can be activities such as varying credit limits, collections strategy options (e.g., do nothing, call, legal action, letter, etc.), or marketing campaign options (e.g., direct mail, telemarket, coupon offer, etc.).

Figure 3:
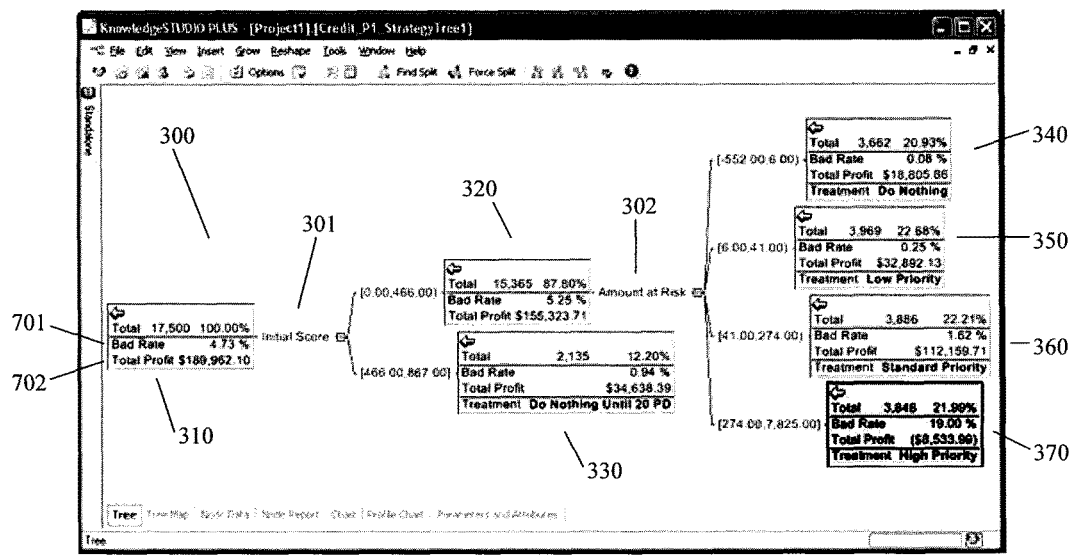
FIG. 3 is a screen capture illustrating a strategy tree built with a strategy tree module in accordance with an embodiment of the invention.

FIG. 3 is a screen capture illustrating a strategy tree 300 built with a strategy tree module 170 in accordance with an embodiment of the invention. The strategy tree 300 is shown in a strategy tree view 303 in FIG. 3. The strategy tree module 170 helps users define and implement customer specific rules or strategies. In the example shown in FIG. 3, the objective is to develop a collection/customer contact strategy for a card issuing retail chain. The root node 310 is split on credit score 301. Very low risk customers 330 are not contacted until 30 days past due. The remaining customers 320 are prioritized based on the amount at risk 302. Higher balances 340 are given a higher priority than lower balances 370. The workflow for a user using the strategy tree mode 170 is simple, intuitive, and a natural fit with the flow from data mining systems such as KnowledgeSTUDIO™. Prior to executing the strategy tree building functionality of the module 170, data preparation, profiling, and predictive modeling can be completed by the data mining system. In order for a user to develop, deploy, and test strategic options and treatments for segments of the market using strategy trees, the user typically completes the following steps:

Define the business objectives
    Example: Should a loan be approved? More approvals means more revenue in interest but the user needs the correct thresholds for write offs.
    Example: What should be done with a delinquent account? Users typically want to maximize cures with minimized spend.
    Example: A problem is found with an existing strategy with marketing campaign uptake too low in some segments and declines too high in others. Users typically need to optimize and verify strategies.
    Example: A churn rate is too high and there is a need to implement a retention campaign to keep a user's most valuable customers.

Extract a study dataset and data preparation
    Data may be pulled from various locations such as a data mart or directly from the source system.
    It is important to pull variables into the data mining system or develop data elements/scores that include things that a user may wish to use in their strategy tree segmentation or modeling prior to strategy tree development. These data elements can include things like demographic information, account information, previous transaction history, or predictive scores (e.g., risk scores, attrition scores, response scores, etc). Data can be transformed and prepared in the data mining system using model building, scoring wizards, and calculated columns to derive new data points for analysis.

Design strategy
    Build the user's strategy tree by splitting on various elements
    Add KPI or node calculations such as profitability, average balance, etc., at each node Assign actions or treatments to each leaf node depending on calculations Verification and approval of strategies
    Statistical verification can be performed
    Estimation of financial benefits can be computed and reported
    Easy visualization ensures that auditors can quickly assess whether the strategy is aligned to legal constraints and corporate policy Strategies can be translated into a deployment language or copied as is (i.e., a strategy tree may be copied to a web site directly and an end customer may be displayed a message through the site directly)

All dependencies such as data mining models and data transformations are embedded in the strategy model XML.

Code generators include SAS, SQL and PMML

They may be re-keyed into mainframe applications

Deploy into live environment

This may be as simple as moving the new XML document into place.

Run batches (via the GUI or scripted) to generate lists of treatments

Real-time

Monitor

Compare live data with strategies through a verification function

Are treatments as expected resulting in required business performance metrics?

What are the opportunities for improvement?

Figure 4:
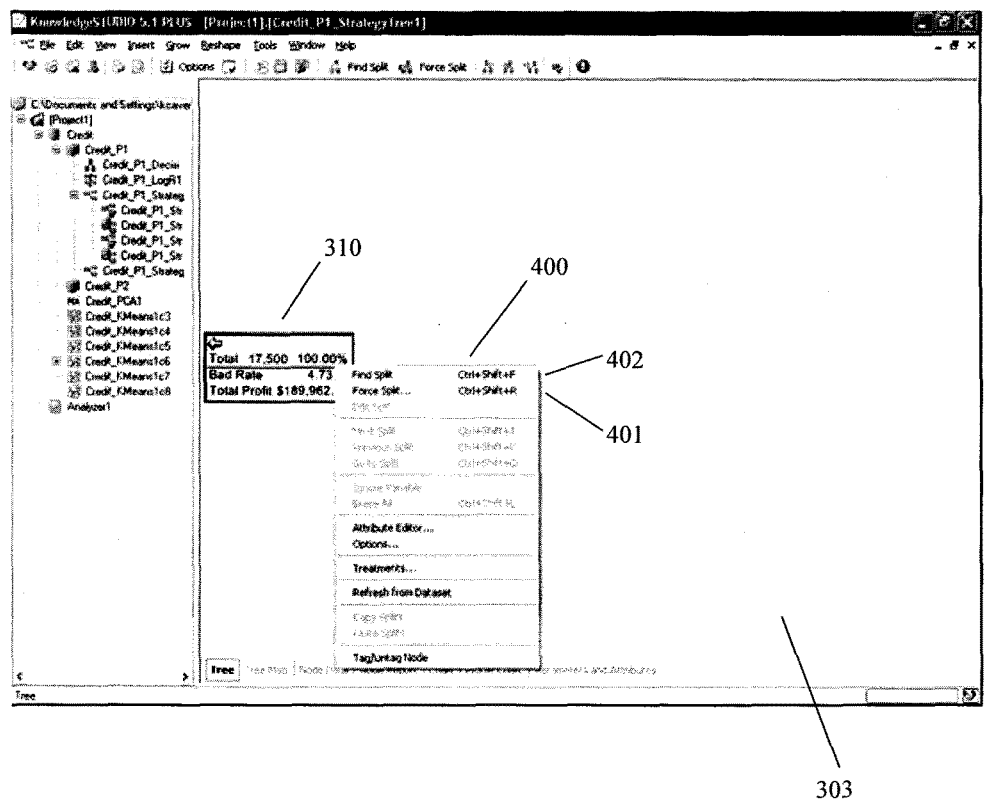
FIG. 4 is a screen capture illustrating a root node splitting options menu of the strategy tree module in accordance with an embodiment of the invention.

FIG. 4 is a screen capture illustrating a root node splitting options menu 400 of the strategy tree module 170 in accordance with an embodiment of the invention. FIG. 4 shows a strategy tree 300 with a root node 310 and menu options for manually ("Force Split") 401 or automatically ("Find Split") 402 developing the tree 300 though splitting of nodes (e.g., 310, 320). Tree growth of a strategy tree 300 is similar to the decision tree functionality of data mining systems such as KnowledgeSTUDIO™. Segments can be created using any available data and splits can be computed to optimize on a number of different variables. Once a user has imported their dataset, the user can split the tree data on any data element they wish in order to complete their segmentation. The user is also able to bin their data through a range editor prior to completing splits. Node calculations are expressions that are applied to each node (e.g., 310-370) of a strategy tree (e.g., 300). Calculations are often key performance indicators such as total profit, average spend, bad debt percentages, etc. The KPI calculations assist in determining which actions will be assigned for each node or segment of the user's target group. The user may also want to use node calculations for estimating the benefit of the strategy or displaying other attributes, such as demographics, so other qualities of the strategy can be understood. An expression editor 600 (described in more detail below) is used to generate SQL code that will be applied as the calculations to nodes 310-370 in a strategy tree 300. The user can specify, if they wish, calculations to apply to all the nodes 310-370, the root node 310, or just the terminal nodes 340-370.

Figure 5:
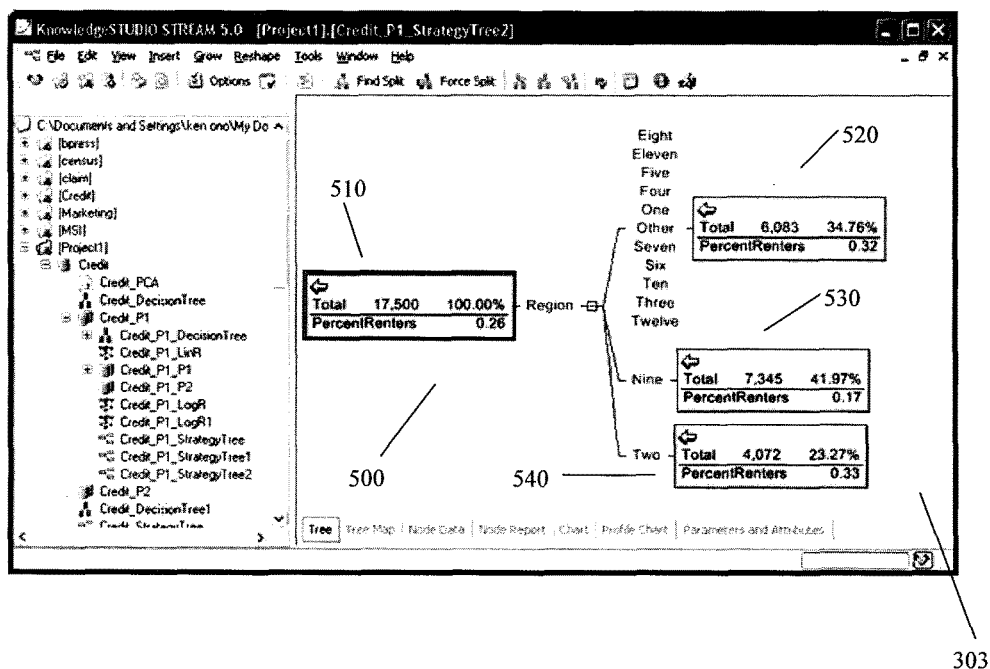
FIG. 5 is a screen capture illustrating a strategy tree for a rental property application in accordance with an embodiment of the invention.
Figure 6:
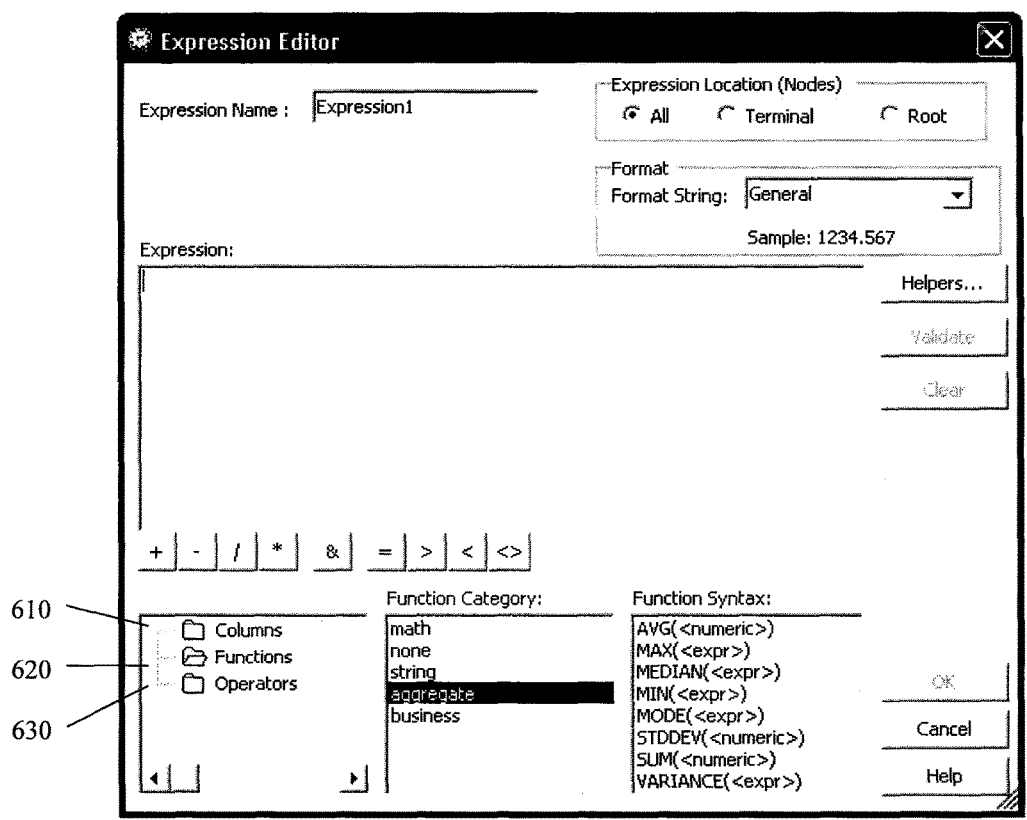
FIG. 6 is a screen capture illustrating an expression editor in accordance with an embodiment of the invention.

FIG. 5 is a screen capture illustrating a strategy tree 500 for a rental property application in accordance with an embodiment of the invention. And, FIG. 6 is a screen capture illustrating an expression editor 600 in accordance with an embodiment of the invention. The expression editor 600 provides advanced users with aids for creating custom aggregate SQL calculations for the strategy tree nodes 510, 520, 530, 540. The expression editor 600 is used to perform a node calculation to be applied to all nodes and denoting the percentage of renters within each node of the strategy tree 500. In a marketing context, a user may apply an action or treatment for a direct mail depending on a business rule built around geographies with a high percentage of renters. In this case, a user would split a root node 510 on geography (i.e., region), then calculate renters as shown and apply a treatment based on business rules (e.g., targets in areas with >50% renters get a direct mail).

The expression editor 600 provides aids to create common calculations for the nodes 510-540 of a strategy tree 500. Helpers consist of columns 610, functions 620, and operations 630. Columns 610 provide a list of columns in the dataset that can be used for calculations. Functions 620 include categories such as average, minimum/maximum, sum, variance, etc. Operators 630 include standard components used in creating a SQL expression (e.g., <, =, < >, etc).

For users who do not wish to or do not know how to input a SQL expression, the strategy tree module 170 provides efficient wizards to calculate commonly used expressions. According to one embodiment, analysts have a choice of five expression types:

Sum—a calculation based of the sum a field (e.g., sum of profit).

Average—a calculation of the average of a field (e.g., average profit).

Conditional Aggregates—an aggregate calculation based on a criteria (e.g., if avg age>50 then provide average account balance—provides calculation only in nodes where average age is greater than 50).

Index—a calculation for each node will be normalized between 0 and 1 (e.g., if the user does not need exact values the user uses this to "rank" nodes). If the user is looking for sales performance by region, the user can index the nodes to show how each compares as a percentage of the total sales located in the entire population.

Discrete Distribution—shows a percentage or count within a node (e.g., % of bad debt).

When a user creates a predictive model, cluster model, decision tree, or strategy tree, the source dataset is examined to find any expressions that were created in the dataset expression editor 600. These expressions are copied to and stored within the model when it is created. These copied expressions are used when the model result (i.e., a score, estimation, cluster, or treatment) is computed. The idea is that when a model is deployed, the inputs required to compute the result are the same inputs that the user originally imported during the model building process. Any columns derived with the dataset expression editor 600 are computed automatically immediately before the actual model is run. Note that sometimes dataset expressions reference models. For example, when a user scores a model and appends the scores to a dataset the user will see that expressions with the "MODEL" keyword are associated with the generated columns. These expressions compute the model result. When a user creates a model and uses an input that is the result of another model, the model required to compute the input is copied and stored within the new model being created. The referenced model is a "sub-model" within the new model. In short, dataset expressions created during the modelling and design process that are model results are treated the same way normal expressions are. The expressions and sub-models stored within the model are displayed in the "Parameters and Attributes" tab (see FIG. 3). If the user does not want the expressions to be incorporated as part of the model, the user must remove them from the dataset prior to creating a model. This can be done by using the "Insert|Dataset" command (see FIG. 3) and a file driver. The user selects the dataset with the unwanted expressions and this command will copy the data and remove the expressions.

Figure 7:
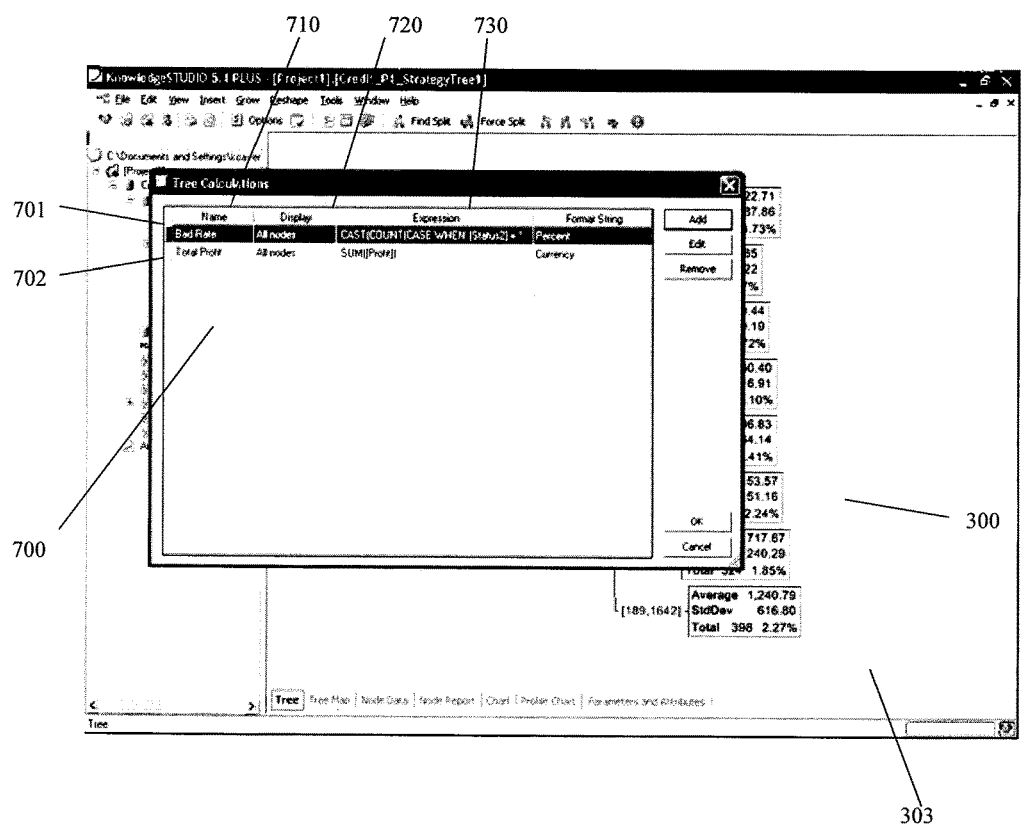
FIG. 7 is a screen capture illustrating a node calculations dialog box in accordance with an embodiment of the invention.

FIG. 7 is a screen capture illustrating a node calculations dialog box 700 in accordance with an embodiment of the invention. This calculations dialog box 700 illustrates the various node calculations (e.g., "Bad Rate" 701, "Total Profit" 702, etc.) that are to be used in a strategy tree (e.g., 300). Analysts can alter the name 710, target node 720, actual expression 730, and other factors around the calculation 701, 702. Node calculations 701, 702 may be defined, saved, and edited for application to current or future strategy trees 300, 500.

Figure 8:
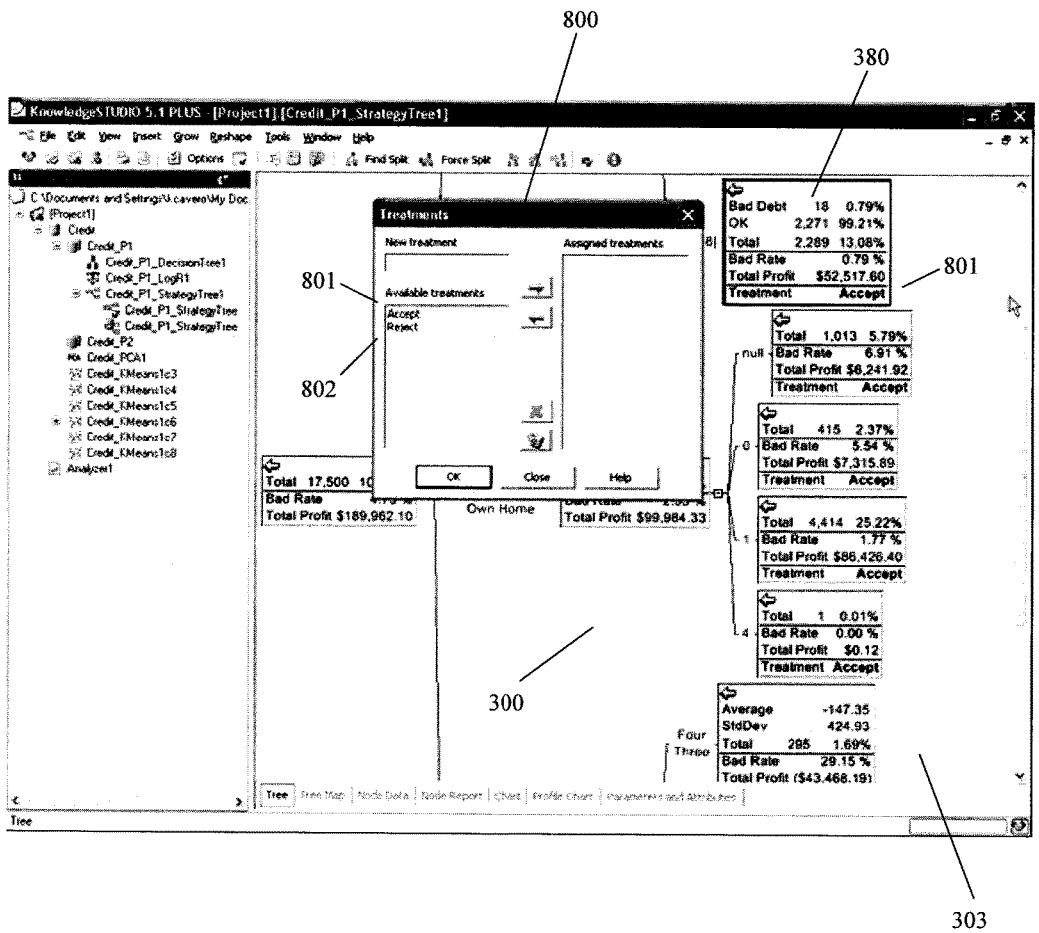
FIG. 8 is a screen capture illustrating a treatment assignment dialog box in accordance with an embodiment of the invention.

FIG. 8 is a screen capture illustrating a treatment assignment dialog box 800 in accordance with an embodiment of the invention. Specific nodes (e.g., 380) can be selected and a treatment (e.g., 801) may be assigned using this dialog box 800. Treatments (e.g., "Accept" 801, "Reject" 802, etc.) are applied by assigning an action, or set of actions, to a segment 380 defined by the tree 300. Typically, the node calculations 701, 702 are used to determine the treatments 801, 802. For example, a direct marketer might choose to send a letter to all those people in nodes with an average spend per month of over $500. A credit analyst might apply a business rule that allows a credit limit to be increased by $1000 for all customers in a node where the risk score is below a certain predetermined limit. Once treatments are confirmed, lists or code are generated that assign the treatments 801, 802.

Figure 9:
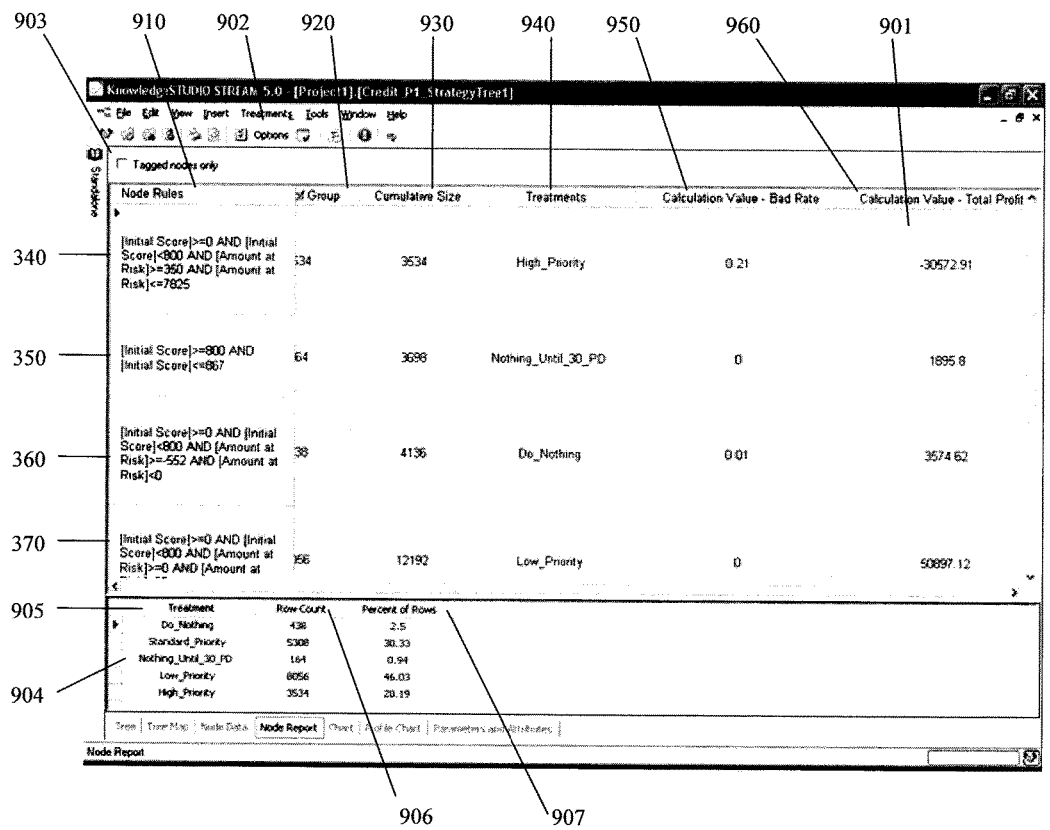
FIG. 9 is a screen capture illustrating a strategy tree node report in accordance with an embodiment of the invention.

FIG. 9 is a screen capture illustrating a strategy tree node report 900 in accordance with an embodiment of the invention. The node report 900 displays information about each node (e.g., 340-370) including calculations 701, 702 and treatments 801, 802 applied. Node reports 900 display the segments and node calculations in a spreadsheet format. From this report the user can sort all the segments 340-370 by any of the node calculations 701, 702 and perform bulk assignments of treatments 801, 802. Treatment totals and percentages are dynamically updated 904 as the user alters a strategy.

The strategy tree node report 900 provides the user with information about the tree calculations 701, 702 in terminal nodes 340-370 of the tree 300. A user may also sort the node report 900 by clicking the column titles 910-960. This is particularly helpful for identifying segments of interest. For example, if a user has a tree calculation that computes the profit (e.g., SUM([Profit]) or AVG([Profit])), then sorting the node report 900 by this column will display the most (or the least) profitable segments. The node report 900 can also be used to assign treatments 801, 802, which is often done after sorting.

According to one embodiment, the following columns are available in the main portion of the strategy tree node report 900: Node Rules 910 (The rules for the node in the decision tree); Node ID (By default this is not displayed and must be turned on in the Options command.); Size of Group 920 (The number of observations in a given node.); Cumulative Size 930 (The cumulative number of observations up to and including this node.); Treatments 940 (The treatment is assigned to the given node. A user can highlight one or more rows and assign them treatments by right clicking on the Treatments command.); Tree Calculation Values 950, 960 (Each of the tree calculations 701, 702 is displayed in the node report 900. The title of the column matches the title of the label when the expression was defined. A user can sort the node report 900 by clicking on calculation headers.); Cumulative Calculation Values (If a user turns this option on (it is off by default), then the calculation values are cumulatively summed. This is useful for selecting cut off points and managing resources. The amounts are accumulated by the current sort order.); Node Percent (If a user turns this option on (it is off by default), then the node calculation is displayed as a percentage of the sum of node calculations for all nodes. This will only make sense in some circumstances, namely when the calculation is a SUM or COUNT.); and, Cumulative Node Percent (If a user turns this option on (it is off by default), then the node calculation is displayed as a cumulative percentage of the sum of node calculations for all nodes. As with Node Percent, this will only make sense in some circumstances, namely when the calculation is a SUM or COUNT.).

According to one embodiment, at the bottom of the strategy node report 900, there is a table 904 that summarizes each of the treatments 801, 802. The table 904 may include the following columns: Treatment 905 (The treatment as entered when assigning treatments.); Row Count 906 (The number of rows that have been assigned the treatment. This is useful for managing resources. For example, a user may have a fixed budget or limited call center capacity.); and, Percent of Rows 907 (The Row Count of the given treatment divided by the number total of rows in the dataset.).

According to one embodiment, the strategy tree Options menu or command 902 (shown as a button for selecting an Options menu in FIG. 9) allows a user to change which columns are displayed, adjust the font size, and change the precision of percentages.

Figure 10:
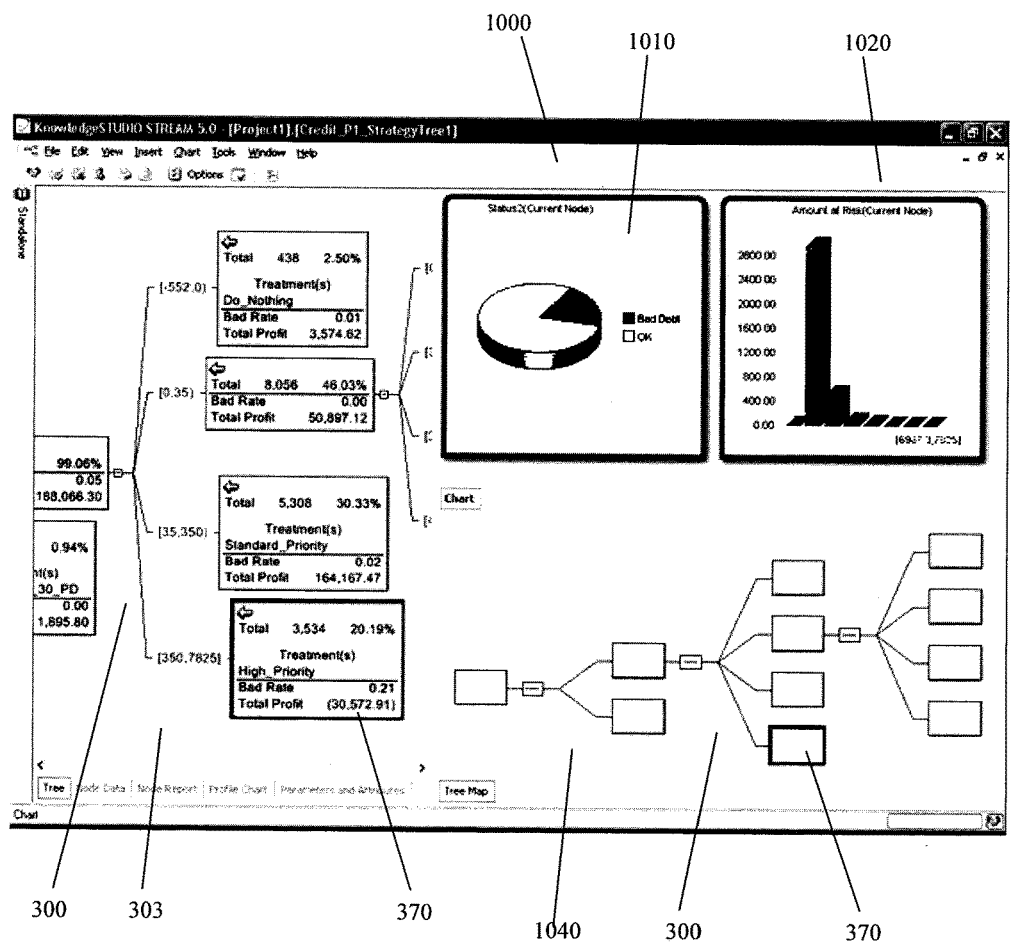
FIG. 10 is a screen capture illustrating a chart information display in accordance with an embodiment of the invention.

FIG. 10 is a screen capture illustrating a chart information display 1000 in accordance with an embodiment of the invention. FIG. 10 shows a chart information display 1000 which presents data within various nodes 340-370 of a strategy tree 300. The chart function of the strategy tree module 170 allows the user to see (i.e., through charts 1010, 1020) the distribution of variables (e.g., "Bad Debt", "Amount at Risk") within a chosen node (e.g., 370). These charts 1010, 1020 can be static or they can be dynamic and change as the user navigates the strategy tree 300. A visual combination of static and dynamic charts 1010, 1020, combined with tree views 303, 1040, allows for quick and easy viewing of the user's strategy development.

Figure 11:
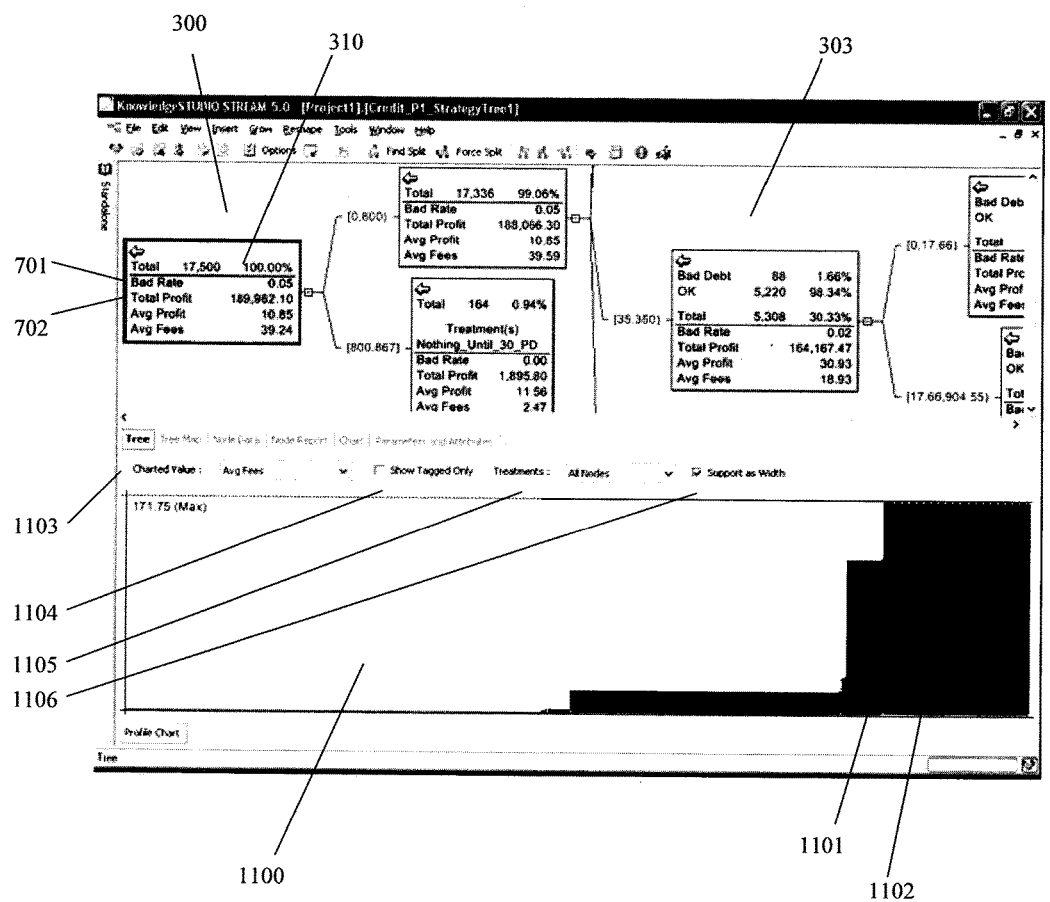
FIG. 11 is a screen capture illustrating a strategy tree profile chart in accordance with an embodiment of the invention.

FIG. 11 is a screen capture illustrating a strategy tree profile chart 1100 in accordance with an embodiment of the invention. FIG. 11 shows a strategy tree profile chart 1100 which presents a visual representation of the value of calculations 701, 702 in each node 310-370 and the number of records per node. The profile chart 1100 shows the value of the user's node calculations 701, 702 throughout the tree 300, showing the user's entire segmentation at a glance. Each bar 1101, 1102 represents calculations 701, 702 applied to a node (e.g., 310), with the height representing the value of the calculation 701, 702 and the width representing the number of records in the node 310. The report 1100 can be used to choose which nodes 310-370 deserve the application of a treatment 801, 802 as determined by the calculations 701, 702 and the number of records. The profile chart 1100 is thus a visual representation of some of the information in the node report 900 mentioned above.

Figure 12:
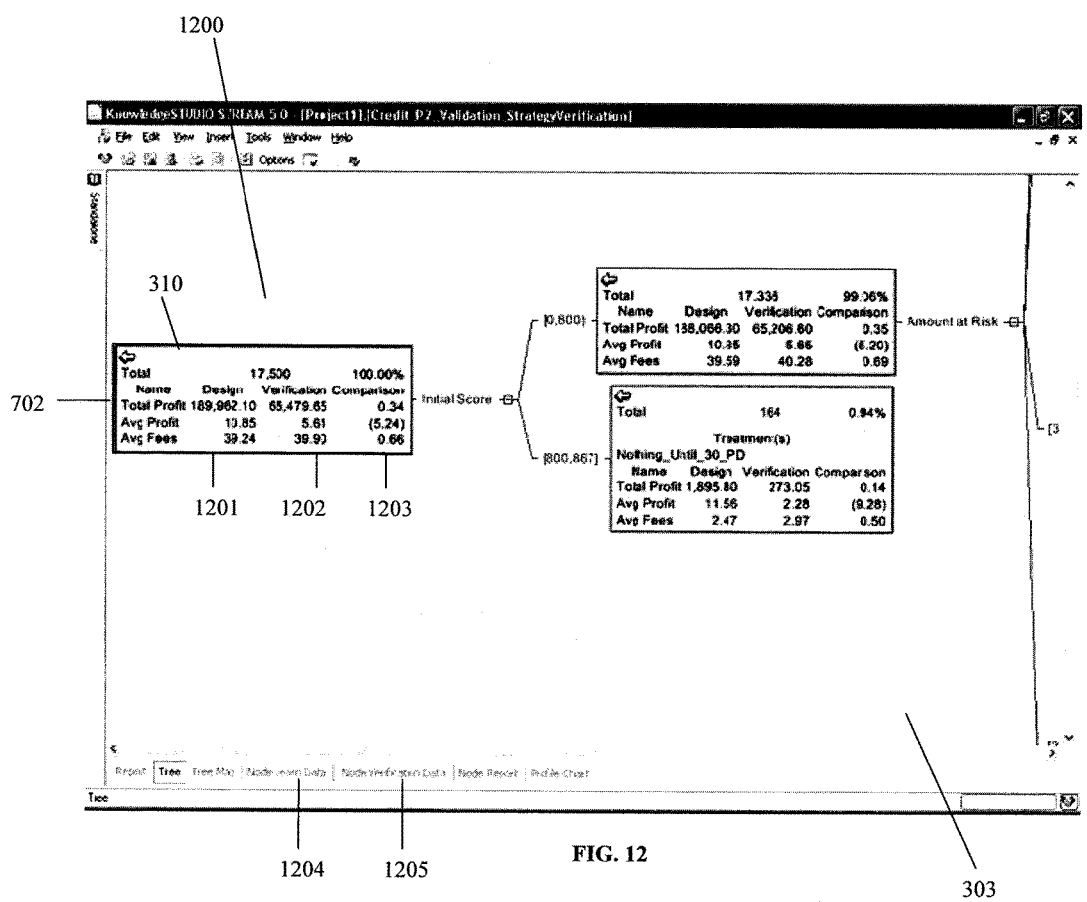
FIG. 12 is a screen capture illustrating a verification strategy tree in accordance with an embodiment of the invention and, FIG. 13 is a flow chart illustrating operations of modules within the memory of a data processing system for applying a strategy to a dataset to address a business problem, in accordance with an embodiment of the invention.

FIG. 12 is a screen capture illustrating a verification strategy tree 1200 in accordance with an embodiment of the invention. After running a strategy verification component of the strategy tree module 170, a new verified or verification strategy tree 1200 is created with node calculations (e.g., 701, 702) for a design dataset 1201 and a verification dataset 1202 computed for each segment (e.g., 310). A comparison 1203 (e.g., difference, ratio or index) is computed as well. Strategy components such as the profile chart 1100 and the node report 900 can be used to visualize and quickly assess the differences between the segments of the two datasets. Verification of a strategy tree 500 allows a user to perform statistical validation of a strategy prior to deployment, confirm that a deployed strategy is working as anticipated, and monitor the performance of strategies as they age. These functions are accomplished by comparing node calculations (e.g., 702), within a tree structure 300, between two datasets 1201, 1202. In the case of statistical verification, the user may compare the node calculations and segments between a design and holdout sample much like the user would for predictive models. For monitoring live strategies, the node calculations and segments from the design period can be compared to the most recent live period. This allows the user to assess if assumptions that supported the original strategy are still holding true. Because the reporting is performed at a segment (or node) level, the user can also understand which segments are contributing to (or detracting from) the overall profitability of the strategy.

The following are two case examples illustrating the use of the strategy tree module 170.

The first example relates to a marketing campaign. The business problem is that marketers constantly struggle with defining accurate and profitable marketing strategies. Profitable campaigns are developed with the input of a variety of factors including segmentation/prediction of target audience, product available for offer, methods and associated costs of delivery, etc. If a marketer has $100K to spend on a new campaign, they need to determine the right target to maximize response and profit. With the strategy tree module 170, the workflow for a marketer in solving this problem consists of a variety of easily executed steps:

Access data and mining views in a data repository or file that contains a combination of customer attributes, predictive scores, and customer segment information. The predictive scores and derived attributes may be computed with a data mining system such as KnowledgeSTUDIO™.

Data is examined and profiled. This data is then segmented into partitions for testing and strategy development.

A strategy tree (e.g., 500) is created with the strategy tree module 170, as the marketer iteratively develops strategies by growing the tree and splitting 301, 302 on characteristics such as predictive scores, age, geography, etc.

Calculations 701, 702 are performed for each node 310-370 to determine performance characteristics such as profitability of the group of customers in the node, or average purchase amounts.

At each node 310-370, treatments 801, 802 or actions can be applied according to the aforementioned calculations 701, 702. Examples could be to telemarket the target group, or just send a mailer.

The strategy tree module 170 provides a treatment summary report 904 and/or node report 900 to produce summaries of treatments and performance metrics for each node 310-370 within the strategy tree 300.

The strategy tree 300 is applied to the holdout sample and the various calculations are compared. Since the calculations are similar between the design and the holdout, the strategy is kept as is.

The marketer determines which strategy calculations 701, 702 and treatments 801, 802 are optimal and lists are generated to run the campaign.

At a later date, verification 1200 can occur to determine whether the treatments 801, 802 are resulting in the desired performance metrics.

Thus, with the strategy tree module 170, a marketer defines segments in their dataset utilizing user-friendly trees, and determines various performance metrics and strategies for subsets (or sub-segments) of the target market. Target lists are easily generated and verification 1200 of strategies can be simply performed.

The second example relates to credit line increase determination. The business problem is defined as follows: the credit department of a major loan organization is mandated with increasing balances and therefore increasing revenue while at the same time maintaining an acceptable number of write-offs. How do they determine to whom to extend credit line increases in order to meet business objectives with the strategy tree module 170? With the strategy tree module 170, the workflow for a credit analyst in solving this problem consists of a variety of easily executed steps:

Access data and mining views in a data repository or file that may contain a combination of account information such as status of account, balance, risk scores, etc. Import this data into a data mining system such as KnowledgeSTUDIO™.

Data is examined and calculated columns are created for additional data elements. This data is then segmented into partitions for testing and strategy development.

A strategy tree (e.g., 300) is created as the analyst iteratively develops segments by growing the tree 300 and splitting 301, 302 on decision key metrics such as tenure, risk scores, age, balance, etc.

Calculations 701, 702 are performed for each node 310-370 to determine performance characteristics such as profitability of the group of customers in the node or average write-off amounts.

At each node 310-370, treatments 801, 802 or actions can be applied according to the aforementioned calculations 701, 702 and the related business rules within the organization. Examples may include "same limit", increase by $1000, or decrease by $2000.

The strategy tree module 170 provides a treatment summary report 904 and/or node report 900 to produce summaries of treatments 801, 802 and performance metrics for each node within the strategy tree 300.

The analyst verifies the strategy by comparing the calculations to the holdout sample. Various profitability estimations are also computed. The strategy is then re-keyed to deploy the campaign into operational systems such as TRIAD™ or the strategy is moved to a data mining system such as KnowledgeSTUDIO™.

At a later date, further verification 1200 can occur to determine whether the treatments 801, 802 are resulting in the desired performance metrics, such as average profit, for the target market in each node.

These example cases show how the strategy tree module 170 provides a credit organization with defined segments, utilizing user-friendly trees 300, and determines various performance metrics and strategies for subsets of the target market. Credit line increases are properly implemented, balances are increased, and interest payments may be improved (i.e., bad rates may be brought in-line with expectations).

A more detailed description of aspects of the strategy tree method of the present invention is provided in the following.

As mentioned above, a strategy tree (e.g., 300) is a series of rules and actions that are developed to help achieve a business objective when interacting with a customer. A tree metaphor, similar to decision trees, is used to define conditions and associated actions. Each segment (or node) (e.g., 310-370) can also display tree calculations 701, 702 that can compute key performance indicators such as profit, losses, purchasing behaviours, or other important measures. To understand strategy trees, it is helpful to understand how they vary from other data mining tools such as decision trees. In particular, the following differences should be noted:

Strategy trees are created manually or automatically based on business rules supplied by the user. In contrast, predictive models are typically generated automatically with an algorithm by applying mathematics to historic data.

Strategy trees prescribe an action or treatment. In contrast, a classifying predictive model predicts the likelihood of a particular outcome. A strategy tree may use this likelihood to prescribe an action. For example, a strategy tree may state, "if the probability of a customer responding to offer A is greater than 10%, then send then offer A". Strategy trees may be considered as "prescriptive models".

Strategy trees may have local dependent variables (but do not require one). In contrast, a decision tree has a single dependent variable that is used for each and every split. To help optimize the business rules, a dependent variable can be used when constructing strategy trees, but this is only to help find optimal groupings and the dependent variable ("DV") can vary throughout the tree.

Strategy trees can display any variable. In contrast, a decision tree has a single dependent variable and its distribution is always displayed in each and every node. With strategy trees, the user can display any variable in their dataset and apply a great variety of calculations.

Now, as mentioned above, a "strategy" is a user determined set of "if then else" rules which are developed and applied to solve a specific business problem. The strategy tree module 170 is a client/server based system that supports the creation, storage, use, and management of multiple strategies, the core functionality of which relates to strategy views, strategy trees, and related functionality. A "strategy view" is for the strategy tree module 170 the equivalent of the "mining view" for a data mining system such as KnowledgeSTUDIO™. The strategy view is the server side repository containing the mining view dataset as extended by a user in the context of building strategy trees. The strategy view preserves a connection to the mining view for traceability purposes and maintains the same row level structure and view of the data, but can be extended in the manner permitted by the strategy tree module 170. A "strategy tree" (e.g., 300) is the means by which the user interacts with the strategy tree module 170 to create strategies. The strategy tree interface differs from a decision tree interface in that the "splits" are user defined "Force Splits" only based on the data elements contained in the strategy view. They are not necessarily algorithmically pre-determined based on the existence of a pre-selected dependent variable. Using the strategy tree module 170, a user can create a user defined set of "if, then, else" rules linked to the data elements contained in the strategy view. A "strategy driver" is the variable selected by a user while interacting with the strategy tree 300 for a given node 310-370 of a strategy tree 300. A "treatment" 801, 802 is the action, output or goal associated with a terminal node (e.g., 340-370) of a branch of a strategy tree 300 as defined by the user. One or more treatments 801, 802 can be associated with a given terminal node 340-370 of a strategy tree 300. And, a "strategy metric" is used by the user to determine the value of a strategy.

For strategy trees, software components in the data mining system associated with decision trees and related engine functionality are extended as appropriate. For example, the "Force Split" interface (including grouping) for selecting strategy metrics is used and extended. As another example, an "Attribute Editor Map" dialogue to enable modification of variables is used and extended. As yet another example, the expression editor 600 is used to support the creation of new variables managed in the strategy view and to support strategy development.

According to one embodiment, the strategy view may be maintained on a Microsoft™, Oracle™, or DB2™ database platform (e.g., 160). Of course, the strategy view may be created and managed otherwise. The strategy tree module 170 can be maintained on the same system (e.g., 101) as the mining view or on a different system (e.g., 102). The strategy tree module 170 supports database level read-write capability. The strategy module 170 is linked to the mining view in such manner that if the mining view is updated the strategy view can also be updated. And, the strategy module 170 contains useful management utilities to prevent data bloat, including, for example, identifying for deletion data elements supported in the strategy view that have not been used for a specified period of time.

Now, for the strategy tree method of the present invention to operate, certain prerequisites must exist. For example, the mining view must exist being created as a result of a prior analysis and modeling process completed by the user. Note that the mining view consists of source data that has been normalized or flattened (likely, but not necessarily, in context of a mining process which has resulted in the production of scores), it will likely include derived data produced using the expression editor 600, it may include scores produced from the operation of one or more algorithms on the data contained in the mining view, and it may be either a randomly extracted sample of source data extracted from a larger external dataset (in an advanced environment) or it may represent the entire source data set (in a less advanced environment).

According to one embodiment, the user interface 180 of the strategy tree module 170 supports capabilities for designing, analyzing, testing, publishing, and managing strategy trees. With respect to the design strategy capability, according to one embodiment "design" includes:

Extending or modifying the mining view to create a strategy view by using expression editor functionality where appropriate, while preserving the row level data view, and link between the mining view and a strategy baseline such that changes to the strategy baseline do not modify the mining view but such that the strategy baseline can always be linked back to the mining view as the "parent";

Enabling the user using the strategy tree to: define (as opposed to having a classification algorithm define) the bin contents and boundaries for each node of the strategy tree by reference to the strategy baseline; and, create, save, and then manage on an ongoing basis, "if, then, else" rules linked to the strategy baseline without having to write queries to do so;

Enabling the user, using comparable functionality to the "Force Split" metaphor, to easily group all or any variables contained in the strategy baseline, including: by scores only (either as in the original mining view as carried into the strategy baseline or as grouped or modified within the strategy baseline including user defined thresholds or filters or clustering of scores into score bands); by data variables other than scores (either as the original mining view or in the strategy baseline or as grouped or modified within the strategy baseline including user defined thresholds or filters or clustering of data elements); by newly defined data variables created at the time of strategy design which are written back to the strategy baseline at the time of creation and thereafter available to be used; and, by adding a model or score calculation "on the fly"; and, Enabling the user using comparable functionality to an "Attribute Editor Map Editor" to modify all or any of the variables contained in the strategy baseline.

Allowing the user to edit the data source definition (e.g., defining how to connect to the database, specifying one or more tables, specifying join criteria, specifying key fields, etc.).

With respect to the analyze strategy capability, according to one embodiment "analyze" includes:

Enabling the user to insert calculations at any node of the strategy tree to determine the value of the strategy relative to the strategy metric at that node;

Multiple treatments;

Enabling multiple calculations of different strategies and assisting in the automated comparison of these strategies for relative value or performance as defined;

Enabling the user to apply calculations previously determined to multiple nodes of the strategy tree (e.g., all nodes, all nodes in branch, this node) to determine the value of the strategy;

Providing automated production of simple graphical visualizations of the strategy value (including enabling the user to easily visualize differences in strategy value) and the ability to apply a currently existing report (e.g., cross tab report) to one or more nodes in a decision tree to determine the impact of the filter/rule/deployment strategy on the records within the node(s);

Providing the ability to create a segment size report showing frequency distribution after scoring (i.e., the derived variable is the segment ID and data profiling);

Providing the ability to produce KPI reports by identified segment including raw measures (e.g., total dollars represented by each segment), absolute measures (e.g., % of total dollars in each segment), and relative measures; and, Providing the ability to show modeling results by segment, including deciles by segment cross-tab (with filter to add third dimension to cross-tab).

With respect to the test strategy capability, according to one embodiment the following functions are provided:

"Create Test Group" where the user has the option to create a test group for evaluating a strategy once a strategy has been created and a treatment has been assigned, resulting in a segregation from a total population of targets otherwise covered by the strategy into a test group; and, "Create Control Group" where the user has the option to create a control group for evaluating a strategy at either the strategy baseline level (i.e., partition and exclude records), or once a strategy has been defined, resulting in the random selection from the total population (either at the baseline or at the strategy level) of a control group which does not receive the treatment.

With respect to the publish strategy capability, according to one embodiment "publish" includes:

Saving the strategy tree (that may include embedded codes and sub-models) to a central repository for review and assessment by users with permission to access the system and making the strategy tree available to real-time interfaces;

Expressing the strategy tree as machine readable code that can be implemented as a stored procedure in a relational database;

Applying all of the decisions made, either through code or through an interface, to a new dataset (e.g., for a standard user, if a strategy tree has been created, point the strategy to a new external dataset, execute the strategy, and view the results of applying the strategy);

Exporting filtered datasets to generate lists (e.g., text files) and tables or views in the repository;

Defining set of fields that will be exported as part of a dataset export process; and, Tracking relationships between original datasets, decision trees, decisioning rules, and resulting filtered datasets.

And, with respect to the manage strategy capability, according to one embodiment "manage" includes:

Reading new source data into a strategy and updating the strategy view based on selected strategies;

Writing calculated items to the strategy baseline and extending it in context of strategy development with options to apply new calculations to all data or to row level data;

Writing strategies to a database;

Rolling-up strategies defined at the row level (e.g., account or product) to higher aggregate levels with automated grouping (e.g., by address or postal code, etc.);

Eliminating/suppressing treatments based on lookup for a "do not call" table or external list;

Comparing strategy effectiveness or values from period to period;

Showing new instances/opportunities/targets based on the strategy selected; and, Viewing segment transitions through time (e.g., model last year versus this year, model refresh versus rebuild analysis).

The user interface 180 of the strategy tree module 170 may include a number of screens and menus. According to one embodiment (e.g., FIG. 3), the user interface 180 includes a file menu, a view menu, and window menu, and a help menu. The file menu may have selections including: Select Data Set; New—Use to Create A New Strategy; Open—Use to Open A Current Strategy; Close—Use to Close An Open Strategy; Save—Use to Save Strategy to the Strategy View; and, Properties. The view menu may have selections including: Normal; Print Layout; Header/Footer; Full Page; and, Zoom. The window menu may have selections including: New Window; Arrange All; and, Split. And, the help menu may have selections including: Strategy Tree Help; and, About Strategy Tree.

The user interface 180 of the strategy tree module 170 also includes strategy tree specific screens and menus. According to one embodiment, the user interface 180 includes: a Strategy View menu; a Strategy menu; a Strategy Designer menu; a Strategy Analyzer menu; and, a Strategy Publisher menu (e.g., available through the tool bar of FIG. 3). The Strategy View menu may have selections including: Create View (Replicate Mining View; Pop Expression Editor); Edit View; and, Delete View. The Strategy menu may have selections including: Create New Strategy; and, Open Current Strategy (View; Edit (Undo, Redo, Cut, Copy, Paste, Clear, Select All, Find, Replace); Delete). The Strategy Designer menu may have selections including: Design Strategy—Use Force Split, Attribute Editor, etc. (Rank Scores By < > (e.g., Highest, Lowest, Top N, Most Recent); Rank Nodes By < > (e.g., Highest, Lowest, Top N); Ignore Scores < > to < >; Label Nodes as < >; Group Nodes < > as < >); and, Save Strategy (New Strategy; Overwrite Existing Strategy). The Strategy Analyzer menu may have selections including: View Strategy Value (Using node level histograms (selected Metric against Data; estimated value against Data); Using segment viewer (Treatment Value By Segment (Score Range, Node Ids or Groups); Segment Size By Segment (Score Range, Node Ids or Groups); Total Opportunity Represented By Segment (Score Range, Node Ids or Groups); % of All Opportunity Represented By (Score Range, Node Ids or Groups); Relative Value of Opportunity Represented By (Score Range, Node Ids or Groups); Segment Transition By (Score Range, Node Ids or Groups); Import from Excel (Calculation or Value for Score Range, Node Ids or Groups); Export to Excel (Dataset for Score Range, Node Ids, or Groups)). And, the Strategy Publisher menu may have selections including: Publish Strategy; Export Strategy (Create Control Group\Create Test Group (To Execution Engine (SQL Server; Oracle™; DB2™; SAP™; Siebel™; Fair Isaac TRIAD™; AMS Strata™; OLAP Cube™; data mining system (e.g., KnowledgeSTUDIO™); As File (Text; ASCII)); and, Export Data.

Now, with respect to specific functionality of the strategy tree module 170, first, the strategy tree module 170 includes an insert strategy tree function. With this function, users can create a new strategy tree with the command "Insert|Strategy" (e.g., see the tool bar of FIG. 3). The first step prompts for the dataset. It defaults to the current, but users can change this. The first step also prompts for the strategy tree name. It defaults to "Strategy Tree <N>," where N is blank or a numeric suffix to guarantee uniqueness. The first step also allows the user to specify an existing tree to copy. If one is selected, the tree starts with the specified tree's shape. The tree being copied can be a decision tree or a strategy tree. The second optional step relates to node calculations where users can define calculations that will be displayed at the nodes. Thus, according on one embodiment, a strategy tree may be created from an existing or new decision tree stored in the data mining system.

The strategy tree module 170 also includes a strategy tree viewer and editor function (e.g., available through the tool bar of FIG. 3). With this function, strategies can be viewed and manipulated using a visual tree metaphor. By default, strategy trees are displayed in horizontal mode (e.g., 300 in FIG. 3). However, they may also be displayed in vertical mode. The strategy tree object is a distinct object from a decision tree with its own set of menus and tabs. The strategy tree object has differentiated icons that combine the notion of tree, actions, and treatments that is differentiated from the decision tree icon in a data mining system. The "Find Split" command (e.g., available through the tool bar of FIG. 3) prompts for a dependent variable and creates a split list. If the parent of the current node has a dependent variable ("DV"), it is used by default, but the user may change it. The Find Split command may use an entropy algorithm. If the Find Split is used, then the DV distribution is displayed in the current node and its children. In nodes that were not created this way, only the treatments, calculations, and node size are displayed. The DV name is displayed in the node above the DV distribution. This behaviour is required only for strategy trees (not decision trees) because the DV can change anywhere in the tree and it is not obvious what the distribution is reporting. If a Find Split is done on a node that was created by a Find Split (it has a DV distribution) and a different DV was selected, then only the distribution for the lower DV is displayed in the node interior. In other words, the higher DV distribution of the child node is overwritten by the parent of the lower DV. If a Find Split is done on a node that was created by a Find Split (it has a DV distribution) and a different DV was selected, then the distribution for both DV's is displayed in the node. For example: "DV A" may branch to "DV A" and "DV A & DV B". Then, "DV A & DV B" may branch to "DV B DV B DV B".

If the parent node has treatments, Find Split (or the "Force Split" command) removes the treatments. This is because treatments are not generally allowed on interior nodes, although they may be.

In contrast, for decision trees, the Find Split command computes the best ways to segment data in the current node. The most significant split is displayed in the tree. Any previous child nodes are removed. All alternative splits that are above the filter threshold are computed and stored for use with the next, previous, and go to split commands. The nodes created are determined by a selected measure and algorithm, and the various parameters associated with each. And, the nodes created are affected by the individual variable settings in an attribute editor. The attribute editor allows a user to fine tune the variables of the decision tree analysis. The tree attribute can be copied from one tree and pasted into another tree to inherit the attribute. In the attribute editor there is a copy and paste button available for the user.

For strategy trees, the "Force Split" command (e.g., available through the tool bar of FIG. 3) allows the user to create child nodes using his/her own choices. The first step of Force Split displays a list of all variable names that are active in the decision tree. The cardinality is displayed. When the user selects a continuous variable (according to an attribute editor), a new dialog is displayed that lists the ranges. The columns are: Row #, Source Range (From and To), Weight, and Target Branch. The number of bins defaults to the attribute editor setting for the variable and is equal to height. The user can group adjacent rows and merge them. The user can enter an arbitrary break point that will split a row. If the value is greater than the maximum or less than the minimum, a new row (with a weight of 0) will be created. An optional slider with multiple thumbs may also be used to adjust the splits. There is a thumb for each interval (i.e., 1 minus the number of rows). Moving a thumb adjusts the interval. Double clicking a thumb-less area is like a "Break" command. A user can right click delete a thumb to group the adjacent rows. A button is displayed that re-computes the weights. (This is because it takes some time to recomputed the weights on large datasets.) Note that the weights may also be re-computed automatically. There is a way that a user can re-compute the ranges. The user can enter the number of bins, whether equal height or equal width. The weights should be the same size if equal height was selected, but is subject to "lumpiness" in the data. The ranges should be equidistant if equal width is selected. When the user selects a discrete variable (according to an attribute editor), a new dialog is display that lists the values. If the cardinality of the variable is greater than the number of bins ("NOB"), then the NOB—1 most populous values are displayed and the remaining values are grouped into an "Other" bin (displayed as ### or otherwise). Adjacent and nonadjacent rows can be selected and grouped. After a group has been created, it can be ungrouped with the Break command. After the grouping step is finished the decision tree is adjusted accordingly.

For strategy trees, an "Edit-Split" command is supported which allows adjustments to splits while preserving unchanged branches.

For strategy trees, the "Go To Split" command allows the user to select a variable from a sorted list of independent variables that have been identified as significant. The list is sorted from most to least significant and includes all variables equal to or greater than a filter threshold. After selecting the variable, the tree is adjusted to display the selected split.

For strategy trees, the "Next-Split" command (active when >1 split has been computed for the current node) allows changing the tree to display the next significant split in descending order. When a user is at the least significant split, it returns to the most significant. In addition, for strategy trees, the "Previous-Split" command (active when >1 split has been computed for the current node) allows changing the tree to display the next significant split in ascending order. When a user is at the most significant split, it returns to the least significant.

For strategy trees, the "Ignore Variable" command removes the variable of the current split from the analysis. (The same effect can be accomplished by ignoring the variable in the attribute editor.)

For strategy trees, the "Copy Splits" command stores the tree structure from the current node in the clipboard. A user can store multiple tree structures in the clipboard. This is so that Edit Splits can be performed without changing the sub-nodes. In addition, for strategy tress, the "Paste Splits" command recreates a tree with a structure previously stored in the clipboard. If there is more than one tree structure in the clipboard, it prompts the user to select one. Users can copy the visual tree and paste it into any application such as Microsoft Office™. The Copy and Paste Splits commands can be used to move tree shapes between strategy trees and decision trees.

For strategy (or decision) trees, the (Edit) "Copy Tree" command creates a vector-based image of the tree (i.e., a Windows™ metafile). Once pasted into Word™, it can be resized. In addition, the (Edit) "Copy Data" command copies the rows from the current node into the clipboard. Because this command may take a long time to execute, there is a modal progress message that allows the user to select "Good Enough" (to stop copying but preserve data in the clipboard) or "Cancel". Furthermore, the (Edit) "Copy Screen" command creates a bitmap object of the visible portion of the tree. Note that the nodes in strategy trees may have coloring. For example, strategy trees support a color binding for each treatment (as one coloring option). The terminal nodes that have a treatment, will be 100% the related color. Each interior node is coloured proportionally based on the distribution of the treatments in its children. For example, if treatment A is red and treatment B is blue and treatment A is 50% of the records, then the interior node is 50% blue and 50% red. A color binding for each node calculation (as a one color option) is also supported. This may be a gradient coloring of discrete DV's except it would use a node calculation.

For strategy trees, the "Insert Node Dataset" command creates a new dataset as a child of the current tree containing the rows represented by the current node.

And, for strategy trees, a "Copy Model" command, a main tree view, a tree chart view, and a tree data view are supported.

Notable command and functions that are not available for strategy trees that are available for decision trees include "Split Report", "Tools|Validation", "Pruning", "Re-Substitution", and "Grow Automatic" as these assume a dependent variable.

The strategy of tree module 170 also includes a node joining function. With this function, two or more terminal nodes may be joined for further splitting with the "Tools-|Join" command (e.g., available through the tool bar of FIG. 3). The user first must tag two or more terminal nodes. The Tools|Join command creates a new node with all the records in the joined nodes. It is displayed at the bottom of the tree in an "average X" position that does not overlap other joined nodes. A line from all of the joined nodes to the joined node is displayed. The joined node can be further split with the Force Split and Find Split commands. Conceptually, a joined node is similar to copy and paste splits on all joined nodes. To remove a joined node, users right click on the joined node and select the "Remove Joined Node" menu selection. Any changes to any parent of a joined node (e.g., Find Split) will cause the joined node to be removed.

The strategy tree 170 module also includes a calculated fields in decision trees function. With this function, trees have the ability to display an arbitrary aggregation computation on a node. These calculations can be computed based on the child nodes or recomputed in interior nodes. The "Tools|Node Calculations" command displays a grid or table where a user can enter any number of expressions. The following is an example table:

| Name | Type | Display | Expression |
|------|------|---------|------------|
|      |      |         |            |

[Add] [Delete] [Edit] [Import] [Export] [OK] [Cancel]

Only calculations are listed in the table. The "Name" attribute allows the entry of a label for a calculation that is displayed in the tree. The "Add" command allows a user to create a new expression and pops up the expression editor. The "Edit" command is enabled when a user selects a row and allows the user to edit the expression. This action can also be done by double clicking the row. Expressions may be deleted with the "Delete" command button. The "Import" and "Export" command buttons allows a user to conveniently move expressions from tree to tree. The "Import and Export" wizard will only show trees that are compatible with respect to the variables. The "OK" button commits the changes and saves the expression. The "Cancel" button warns the user that changes will be lost (if any) and exits without changing the tree. Fields that are ignored in the tree model, but present in the dataset can be referenced in the expression. The expressions are saved for future editing. The results are saved for each node so the tree can be recalled quickly. And, there is a "Recalculate" command to quickly refresh calculations on newly created nodes.

The strategy of tree module 170 also includes a calculation from split function. The "Tools Calculation From Split" command (e.g., available through the tool bar of FIG. 3) is used to generate a new binning calculated field from the optimal splits of a decision tree. In contrast to the binning helpers available at the "Dataset Editor", using the Calculation From Split command will create categories that optimize differences of a dependent variable. One reason for using the Calculation From Split command is to prepare the data for building a logistic regression model. If the continuous variable has a non-linear relationship with the dependent variable, then the following steps may be helpful: bin the continuous variable into optimal ranges (Find Split in the decision tree); create a discrete variable with a category for each range (Calculation from Split); and, convert the categories into indicator variables and train the logistic regression model using stepwise variable selection and consider each indicator variable independently (e.g., "Insert|Predictive Model" has this capability). When the Calculation from Split command is run, the user can append a score column to the dataset associated with the current decision tree, or the user can create a new dataset. The user can also generate the SQL, copy it to the clipboard, and cancel the wizard. Then, the user can paste the calculation into the dataset editor of any dataset.

The strategy tree module 170 also includes a node report function. With this function, a view on the strategy tree (e.g., 300) called a node report 900 displays the terminal nodes (e.g., 340-370) as a row 340-370 on a grid 901. The first column of the node report 900 is labelled "Node Rules" 910 and displays the generic rules for each node. An "Options" menu or command 902 feature allows the rule column to be replaced with a column for each independent variable ("IV") (ordered from top to bottom and right to left in order of appearance of the tree). The column title is the variable name and the cell content is a list of values or the range. The optional second column (off by default) is the "Node ID". It can be turned on with the Options command. The second column is "Size of Group" 920. This displays the number of (weighted) rows in each node. The third column is "Cumulative size" 930 and displays the "Size of Group" accumulated with the current sort order. The fourth column is "Cumulative percent" and displays the percent of Cumulative size. The last row is 100%. (By default this column is not shown.) The fifth column 940 displays the assigned treatment. A user can also highlight one or more contiguous or non-contiguous cells and assign a new treatment. If the user right clicks on a highlighted row, a choice labelled "Edit Treatments" is displayed on the context menu that pops up in an "Edit Treatments" dialog. The counts and percent of the treatments are shown as a legend 904. For example, in FIG. 9, treatment "Do_Nothing" accounts for 2.5% of the rows, treatment "Standard_Priority" accounts for 30.33%, and treatment "Nothing_Until_30_PD" accounts for 0.94% are displayed at the bottom of the grid 901. For each node calculation 701, 702, the calculation value 950, 960, the cumulative calculation value, the percent of the node (calculated by a node calculation/root node calculation), and the cumulative percent is displayed. By default, only the calculation value 950, 960 is displayed. The Options command 902 allows the user to turn on and off any other calculations. Selecting a row navigates the other views. For example, clicking on a row (e.g., 340) of the grid 901 will select the node 340 in the strategy tree viewer 303. A user can select many nodes and tag or untag them all. A user can toggle view tagged nodes only 903. A user can select which columns to display with the Options command 902. A "Tools|Preferences" command allows a user to change future settings for options not related to node calculations. A user can sort the grid by clicking column titles 910-960 in which case any cumulative columns are recomputed for the new order. In general, a user cannot sort the grid 901 by a cumulative column. If a user sorts by treatment 940 (which works best if there is no more than one treatment assigned), then the node report 900 also groups by treatment and provides a total count for each group. If there is more than one treatment 801, 802 on a node, each combination is considered a new treatment for the purpose of grouping. If the calculations are not up-to-date on the main tree (i.e., because the tree has changed and the calculations have not been updated), the cells appear blank (not 0).

The strategy tree module 170 also includes a treatments report function. With this function, the "Tools|Treatments Report" command displays a report (e.g., 904) for all of the treatments 801, 802. The treatment report includes the treatment size in count and percent. All of the tree calculations are displayed in the treatment report. If the expressions indicate "interior nodes=Re-compute," then expressions are recomputed for each population assigned to the treatment. If the expressions indicate "interior nodes=Sum children", then the calculations are computed by adding terminal nodes assigned to the treatment.

The strategy tree module 170 also includes a profile chart function. With this function, a view of the strategy tree called a profile chart 1100 displays each node. The user can select the charted value. Each node calculation 701, 702 is displayed as a choice to plot. The height of the bars 1101, 1102 displayed is the value of the node calculation 701, 702. The bars 1101, 1102 are sorted in ascending order of the node calculation value. The bars 1101, 1102 can be grouped by assigned treatment (e.g., 801, 802). A user can toggle view tagged-nodes-only. A user can tag and untag nodes using this view 1100. Clicking on a bar 1101, 1102 causes navigation in other views (i.e., main tree and node report). The Options command allows the user to fix the Y-Axis scale. There is a tick box labelled "Fixed Y-Axis". If ticked, the user can enter a number that represents the maximum on the Y-Axis. There is a check box labelled "Show Children Only". When checked, only the terminal nodes (e.g., 340-370) that are children of the current node (e.g., 310) are displayed in the profile chart 1100. And, there is a checkbox labelled "Display Support as Width". When checked (default), the width of the bar is the number of records (like normal). When unchecked, each bar has the same width.

Thus, the strategy tree profile chart 1100 displays each terminal node 340-370 in a tree 300. Its purpose is to display the tree 300 in a single chart. Before the profile chart 1100 can be displayed the tree 300 must be grown at least one level and have at least one tree calculation 701, 702. The height of each bar 1101, 1102 represents the tree calculation value for the corresponding terminal node (e.g., 310). Clicking on a bar 1101, 1102 will cause the tree to navigate to that node 310. A user can also right click to access commands such as assigning treatments and tagging nodes. With respect to the profile chart 1100, the "Charted Value" menu item or command 1103 presents a list of each of the tree calculations 701, 702. A user may choose the value that the user would like charted. The "Show Tagged Only" menu item or command 1104, when selected, causes only nodes that are tagged to be displayed. The "Treatment" menu item or command 1105 allows the user to plot only nodes that are assigned to a specific treatment 801, 802. By default, all terminal nodes are displayed. The "Support As Width" menu item or command 1106, when selected (which is the default), causes the width of each bar 1101, 1102 to represent the number of observations in the node. If it is not selected, each bar 1101, 1102 is the same width regardless of the number of rows. Note that if the tree calculations 701, 702 are not up-to-date, then they will not be charted. And, a user may need to use the "Recalculate" command for the profile chart to plot all of the terminal nodes.

In contrast, consider the decision tree profile chart of a data mining system. This profile chart displays each terminal node in tree. Its purpose is to display the tree in a single chart. Before the profile chart can be displayed the tree must be grown at least one level. With a discrete dependent variable, the height of each bar is the percentage of the current dependent variable value and the width of the bar represents the number of observations in the node. With a continuous dependent variable the middle of the bar is the average (e.g., shown as a dashed line) and the top and bottom of the bar plus and minus one standard deviation. The width of the bar represents the number of observations in the node. Clicking on a bar will cause the tree to navigate to that node. The user can also right click to access commands such as Find Split, Force Split, etc. With respect to the profile chart the "Charted Value" menu item or command presents a list of each dependent variable value. The user may choose the value that the user would like charted. If the dependent variable is continuous, then this choice is inactive. And, the "Show Tagged" menu item or command, if selected, causes only nodes that are tagged to be displayed.

The strategy tree module 170 also includes a parameters and attributes tab function. The parameters and attributes tab function (e.g., available through the bottom row of buttons in FIG. 3) displays information about the variables in the tree (i.e., the information in the attribute editor), which variables are actually split in the tree, which variables are required for scoring, and a list of expressions embedded in the model.

The strategy tree module 170 also includes an assigning treatments function. With this function, users can assign treatments 801, 802 to nodes. Users can dynamically create new treatments or assign previously used treatments. The treatment assignment dialog (e.g., 800) is non-modal so the tree can be navigated while it is active. Treatment selections are saved and automatically displayed when the tree is re-opened. Treatments can be assigned on the main tree 300, node report 900, and profile chart 1100. In general, the function will only allow the assignment of a single treatment to terminal nodes (e.g., 340-370). However, multiple treatments and treatments on interior nodes (e.g., 320) may also be supported as an option. If the treatment assignment dialog 800 is active and a user clicks an interior node (e.g., 320), the dialogue becomes inactive. Creating children (e.g., Find Split, Force Split) will remove assigned treatments, if any.

The strategy tree module 170 also includes a code generation function. With this function, users can generate code that can be used to apply the treatments in a different system. "SQL SELECT Treatment" code generation generates a SELECT block for each treatment. If a node is assigned to more than one treatment it appears in each treatment block (i.e., whole tree only). "SQL CASE Treatment" code generation creates a SQL fragment that can assign a treatment to an individual record (i.e., whole tree only). If more than one treatment is applied to the node, a comma separated list of treatments is assigned. Treatments in interior nodes are additional. If the calculated columns feature is available, users can cut and paste the SQL SELECT clause to create a calculated column that computes the treatment. The "ELSE" clause is used when an unknown value is encountered. The most dominate treatment is selected. For example, if the Children are 51% Treatment A and 49% Treatment B, Treatment A is selected. "SQL CASE NODE ID" creates a single CASE statement that returns the node ID (i.e., whole tree only). XML (Extensible Markup Language) is provided that generates the XML document that can be used by the data mining engine (e.g., native XML) (i.e., whole tree only). PMML (Predictive Modelling Markup Extension) is supported for decision trees. The "prediction" will be the user assigned treatment. Calculated columns will be treated as data, so to score with the PMML model requires that the caller re-computes any calculated column. And, there is a choice for SAS™ code generation for strategy trees.

The strategy tree module 170 also includes a managing test and control groups function. The basic idea of test and control groups is to select and execute a small amount of treatments at random (more or less) and the overwhelming majority of treatments according to the strategy. Once the results are in, users compare how well the strategy-selected treatments are performing versus the randomly selected control group. The treatment assignment assumes that there is a field in the mining view that can be used to branch on. For example, the mining view may have a field named "Test Or Control" that contains a "T" or "C". The very first split can segment the population. Another "Random Number" or "Customer ID" column (present in the mining view) may be used to segment the control group and assign treatments. The various reports can be used to compare various metrics (e.g., response rate) between the test and actual groups. For example, a user can tag nodes displayed in the test groups and strategy groups and limit the node report 900 and profile chart 1100 to just tagged nodes.

The strategy tree module 170 also includes an assign strategy (scoring) function. The "Tools|Assign Strategy" (also referred to as "Score Strategy" or "List Generation") menu or command runs a wizard that guides a user through a list generation process. The first step allows a user to select a strategy tree. It defaults to the tree in focus, if any. The first step also allows the user to specify a source of information. A list of datasets in the current project is provided in a drop down menu, or the user can elect to choose an external data source. If an external data source is selected, the user will select one of several available input drivers (e.g., text, ODBC, etc). Typically, the user must map the field names of the input source to the field names of the model. Next, the user is presented with a list of treatments found in the tree. The user may select one or more treatments. Only selected treatments are included in the list. It defaults to all treatments. The user can elect to write the "Node ID" or not. The user can elect to write to a new dataset, to append the treatments to an existing dataset, or to a supported export driver. Appending to an existing dataset is like a helper function that creates a calculated column with a SQL CASE statement for creating an embedded model if the results are incorporated in another model. If it is being written to a file, the next step prompts for the file name. If it is being written to a database, the database information is collected. Once the wizard is complete, the treatments are written.

The strategy tree module 170 also includes a strategy verification wizard function (as mentioned above). With this function, the "Tools|Verify Strategy" menu or command steps the user through a wizard that generates output useful for verifying that a strategy is operating according to design, verifying that strategies meet high level objectives and rules, reporting how well a strategy has performed, and detecting drift in underlying assumptions. The first step also allows a user to select a strategy tree (e.g., 300). It defaults to the tree in focus, if any. The first step also allows the user to specify a source of information. A list of datasets in the current project is provided in a drop down menu. A convenience button is provided to allow the user to import verification data. If the data is too large, standard import sampling may be used. The user must provide a name of the verification object. The second step allows field mapping. The user must map the field names of the verification source to the field names of the model. (i.e., using standard field mapping control with auto-match). The third step allows the user to create a series of node level calculations. It copies the calculations from the selected tree. The same expression editor as for node calculations is available (this has Import/Export). A "Compare Mode" can be set for each calculation. A user can choose from various comparison choices as follows: Compare Mode "None" will not perform any comparison; Compare Mode "Verification—Design" will subtract the learning dataset (Design) from the test dataset (Verification); Compare Mode "Design—Verification" will subtract the test dataset (Verification) from the learning dataset (Design); Compare Mode "Verification/Design" will divide the learning dataset (Design) with the test dataset (Verification); Compare Mode "Design/Verification" will divide the test dataset (Verification) with the learning dataset (Design); Compare Mode "Design/(Verification+Design)" will divide the learning dataset (Design) with the test dataset (Verification) plus the learn dataset (Design); and, Compare Mode "Verification/(Verification+Design)" will divide the test dataset (Verification) with the test dataset (Verification) plus the learn dataset (Design). After the wizard is complete, a new verification strategy tree 1200 is created that displays the expressions on both the original dataset 1201 and the verification dataset 1202 and the requested comparisons 1203.

The strategy tree module 170 also includes a verification tree function. As mentioned, a verification strategy tree 1200 is created with the "Tools|Verify Strategy" command. It has all of the features of a strategy tree 300 with the following differences. First, the verification tree 1200 is static. The Force Split, Find Split, Go To Split commands are not shown or operational. Second, there is a "View Data" tab for node "Learn" data 1204 and a separate "View Data" tab for node "Verification" data 1205. Third, there are three columns for node calculations. They are: "Design" 1201, "Verification" 1202, and "Comparison" 1203, where "Design" refers to the node calculations computed for the Learn dataset, "Verification" refers to the node calculations computed for the Verification dataset, and "Comparison" refers to the ratio or difference between the two (as selected in the verification wizard). Fourth, the node report 900 shows all of the node data from both learn, verification, or comparison. And fifth, the profile chart 1100 allows the selection of any of the calculations from either learn, verification, or comparison.

With respect to verifying a strategy, the "Tools|Verify Strategy" menu or command of the strategy tree module 170 computes tree calculations (e.g., 702) on a verification dataset 1202 and compares 1203 the calculations to the original design dataset 1201. The tree calculations 702 for both datasets 1201, 1202 and a comparison 1203 are displayed in a verification tree object 1200. Purposes of strategy verification include the following: to assess the statistical validity of the design before going into production; to assess if a strategy in testing or early stage production is meeting the intent of original design; to assess if the original design assumptions are still true after the strategy has been running in production for some time; and, to assess the performance of a strategy on a node by node basis. Before verifying a strategy tree 300, a user must have created the strategy tree 300 (built from a design dataset) and the user should have identified a verification dataset that will be compared to the design dataset. If the user is testing the strategy for statistical validity, then typically the user will partition the dataset into two randomly separated datasets; one for design and the other for verification. Typically, the user will have created one or more tree calculations 701, 702.

Now, a verification strategy tree (e.g., 1200) is created through a wizard. To start the wizard from a menu the user would select the "Tools|Verify Strategy" command. Also note that generally there are others ways of validating strategies that do not use the "Tools|Verify Strategy" command. For example, the user can simply use new strategy trees and tree calculations on different datasets. The advantage of the "Tools|Verify Strategy" command is the ability to view and compare tree calculations from two datasets in a single tree 1200.

With respect to how verifying or validating a strategy tree 300 compares to validating predictive models, the primary concern when validating a predictive model is how well the model predicts the outcome. After comparing the predictive model outcomes to known-to-be-correct outcomes, a variety of standard techniques are used to measure the model's abilities. With strategy trees, on the other hand, there is no right or wrong answer, so the validation approach is fundamentally different. User defined metrics (i.e., tree calculations 701, 702) are compared 1203 between two datasets 1201, 1202. It is up to the user to interpret the differences, understand the meanings, and make adjustments.

In the first step of the strategy tree verification wizard (i.e., strategy verification—select model), the verification object name, model to verify, and comparison dataset are specified. The verification tree name is the name of the verification tree object that will be created by this wizard. The model is the strategy tree that is being validated. The dataset that the verification tree was created from is used to compute the design statistics. And, the dataset is the dataset that will be compared. This is the verification dataset. Note that the verification dataset must be imported into the current project. In general, a user may not use an external dataset such as a text file.

In the second step (i.e., strategy verification—tree calculation), the wizard allows the user to set the calculations that will be displayed in the resulting verification tree object. By default it copies the tree calculations 701, 702 from the tree 300 being verified and adds a record count calculation. The user may then modify the tree calculations 701, 702. Some of the tree calculations 701, 702 may not make sense to compare in which case they can be removed or modified. For example, consider the "SUM" function. If the verification and design datasets are of different sizes (e.g., a 70% and 30% dataset partition), then the SUM's will naturally be quite different. Comparisons will be easier if the user changes the calculation to use average which should be a valid comparison regardless of the size of the datasets.

In the third step (i.e., strategy tree verification—map fields), the user maps the fields between the verification dataset and the design tree. This allows a dataset with different field names to be used for verification. The system will match the field names of the dataset with the variable names of the model. If the names match, the user simply selects a next command to proceed.

The strategy tree module 170 also includes a verification strategy tree node report function. The validation strategy tree node report is similar to the strategy tree node report 900. The tree calculations for both the design dataset and validation dataset are displayed. The comparisons are also displayed. Sorting the node report by comparison columns is a useful way to isolate segments that have the greatest differences between the design and validation datasets. Nodes with large differences can be interpreted in different ways. If a user is creating a strategy validation tree to assess statistical validity, large differences may imply that the nodes are too small and should be combined with another. If the user is comparing the original design sample with data from a more recent time, then differences may imply that the circumstances have substantially changed and the assumptions of the original strategy are now suspect.

The strategy tree module 170 also includes a verification strategy tree profile chart function. The verification strategy tree profile chart view displays each terminal node in a tree. Its purpose is to display the tree in a single chart. The profile chart on strategy verification trees operates in a similar way to the strategy tree profile chart 1100.

The strategy tree module 170 also includes a strategy scoring (or list generation) function. Strategy scoring is the process of computing a treatment based on the rules and treatment assignments created by the strategy author. With respect to strategy scoring, the "Tools|Score Strategy" command of the strategy tree module 170 initiates a wizard to get information such as the scoring inputs and outputs. When the wizard is complete, the module 170 will read each record in a specified data source. For each record in the data source, the rules (or tree splits) will be evaluated. This effectively drops the data into the root node of the tree to end up at a terminal node. The treatment that was assigned to the resulting terminal is written to the strategy scoring output file.

One purpose of strategy scoring is to apply the strategies to a dataset so that further analysis and reporting can be performed. For example, in a credit limit increase strategy, a user may wish to apply the (proposed) treatments (in this example, line increase amounts) to the study dataset from which new analytics can be based. Continuing the example, once the treatments have been written to the dataset the user can compute new derived dataset fields such as the new credit limit, estimated future utilization, interest income, and write-offs and then display them in a new strategy tree or simply report the total effect. This may be helpful in explaining the benefits and risks of a new strategy. Another purpose of strategy scoring is to generate lists that can be used by an operational application. For example, the user may generate a list to be read by a call center dialler as the result of applying a collections strategy or generate a list of customers or prospects to mail to as part of a marketing strategy.

Note that tree calculations may be generally ignored during the strategy scoring process. The "Tools|Score Strategy" (also referred to as "List Generation") command is a way of manually invoking a batch strategy scoring process. There are many ways to automate the strategy scoring process on both a batch and a real time basis. For example, the KSQuery™ command line tool and software development environments such as Java™ or Microsoft .NET™ can be used to issue DMX (Data Mining Extensions) commands to automate the batch jobs that produce lists. Real-time strategy scoring can also be programmed. In this case, an application such as a customer facing web site or an in-bound call center application can call a data mining system server to score a strategy model and compute a treatment on an on-demand, real-time basis.

The strategy tree module 170 also includes a grow decision table function. The "Grow Decision Table" command is similar to also "Grow Automatic" command except that it restricts the tree form to a defined set of variables in a defined order. The Grow Decision Table command displays a dialog where the specifics can be entered. The dialog allows for an ordered list of independent variables ("IV") to be specified. The variable list (decision table specification) defaults to a last set of variables specified thus allowing the same decision table to be easily repeated. (This does not occur if the decision table variable list does match the current decision tree's model.) The variable list (decision table specification) can also be saved and reloaded as an XML file. The dialog allows a user to preserve the existing split if there is one. After the dialog is completed, a decision tree is grown automatically. Each level of the tree matches the order of independent variables ("IV") in the variable list. If the variable is not above the significance threshold, then a single child node is created with 100% of the parent's rows. The resultant tree shape is compatible with TRIAD™.

And, the decision table can be exported in a format that can be directly imported into TRIAD™ PCTMS.

The strategy tree module 170 also includes a dataset editor function. The dataset editor function may be used to define expressions. The dataset editor may make use of the expression editor 600 shown in FIG. 6. With respect to expression migration, the following describes how calculated columns flow to partitions and models and ultimately end up available for scoring, in accordance with one embodiment of the invention.

Consider the following basic flow. First, a user imports a text file named "Credit.txt". The data mining system displays the dataset object. The user issues the "Tools|Dataset Editor" command and adds a column named "Age Category" which is a case statement that categorizes individuals into "Young" and "Old" based on ranges of an "Age" column (i.e., CASE WHEN ([age] is null) THEN null WHEN ([age]>=17 and [age]<44) THEN 'Young' WHEN ([age]>=44 and [age]<=98) THEN 'Old' END). The system creates the new column, which is now available on the dataset. The user now creates a predictive model (or tree). The "Age Category" field is used as an input (or a split in the tree). The system embeds the expression into the model itself during the training process (i.e., CASE WHEN ([age] is null) THEN null WHEN ([age]>=17 and [age]<44) THEN 'Young' WHEN ([age]>=44 and [age]<=98) THEN 'Old' END is present in the model XML). The user runs the "Tools|Score" command and uses the Credit.txt file (or a file with identical columns). The system requires the [age] field to perform the scoring and does not require [Age Category]. The scores or treatments are produced.

Now consider the following alternative flows. First, consider the case where models are considered as just another form of calculation. This flow shows how models can feed into each other. First, a user imports a text file named "Credit.txt". The system displays the dataset object. The user issues the "Tools|Dataset Editor" command and adds a column named "Age Category" which is a case statement that categorizes individuals into "Young" and "Old" based on ranges of the "Age" column (i.e., CASE WHEN ([age] is null) THEN null WHEN ([age]>=17 and [age]<44) THEN 'Young' WHEN ([age]>=44 and [age]<=98) THEN 'Old' END). The system creates the new column, which is now available on the dataset. The user creates a predictive model (or tree). The "Age Category" field is used as an input (or a split in the tree). The system embeds the expression into the model itself during the training process (i.e., CASE WHEN ([age] is null) THEN null WHEN ([age]>=17 and [age]<44) THEN 'Young' WHEN ([age]>=44 and [age]<=98) THEN 'Old' END is present in the model XML). The user runs the "Tools|Score" command and appends the score column to the original dataset. The system adds the probability column to the original dataset which is now observable as a calculated column. That is, if the user uses "Tools|Dataset Editor", the new score column allows the user to edit the expression and an expression that calls the model to generate the probability is visible. The user now creates a strategy tree attached to the original dataset. The system copies the expression which invokes the score into the strategy model. It also copies the scoring model itself into the strategy model. The user forces a split on the score column created previously. The user issues the "Tools|Apply Treatments" (also referred to as "Score Strategy" or "List Generation") command and applies the strategy to the Credit.txt file (or a file with identical columns). The system requires the [age] field to perform the scoring and does not require [Age Category] or the score field because they are contained within the strategy model and are computed as required. Finally, the treatments are produced. According to one embodiment, a cluster model may be used as input to a strategy. Thus, a variation on the above is to use a cluster model and force split on an assigned cluster. According to one embodiment, a cluster model may be used as input to a predictive model. Thus, another variation of the above is to use a cluster model and feed the cluster into a logistic regression model.

According to one embodiment, as a variation to all of the above mentioned flows, the dataset may be partitioned. In this embodiment, the partitioning propagates the expressions from the parent dataset to the partitions.

According to one embodiment, scoring outside of the data mining system (e.g., KnowledgeSTUDIO™) using KSQuery™ (a command line interface) and a "C" API is supported. The ".kdm" file (or XML rules, being the same thing) generated in KnowledgeSTUDIO™ can be copied to a different machine and scored with KSQuery™ or the "C" API. The behavior is the same in that only the original columns are required to score (i.e., [age] in the above examples). In the case of referenced models, the referenced model is actually contained within the top level .kdm file, so the same rule applies. Thus, any operational system may now call the strategy. This is described in more detail below with respect to the strategy tree deployment function.

With respect to changes to datasets and models, the following describes how the system handles changes to the calculated columns according to one embodiment.

With respect to partitions, a user first imports a dataset and partitions it into (for example) three random partitions. The user then adds a calculated column to the original un-partitioned dataset and clicks "OK". The system detects that there are partitions and asks the user if the calculations should be propagated to the partitioned datasets. If the user responds positively, the same modifications are made to the child datasets. If the modifications fail (perhaps because the fields are already different on the partitions), helpful error messages are displayed that inform the user what the problem is. In order to rectify the problem, the user must manually fix the partitions.

With respect to models (e.g., MLN, regression, and cluster models) and changing a calculation, models are loosely bounded to the training dataset. As such any changes to the training dataset or sub-models do not affect a trained model. However, the changes would be "noticed" during scoring or retraining. First, a user imports a dataset and adds a calculation. Next, the user creates a model that uses "age" (say "age category" as describe above). The "Age Category" calculation is changed at the dataset. The system displays a warning indicating that the column is referenced by other objects (and lists which ones). When the model is viewed, there is a notation that indicates the dataset has been changed and the model may be invalid. The user performs a Tools|Score or generates code. The system verifies the calculations. If it detects that the calculations of the model no longer match the dataset (as they would in this flow), a warning that the model references a changed calculation is displayed. The user can continue or not. (This is also applied to decision trees.) The user issues a Retrain command. The system updates the expression embedded in the model to the new version as part of the training process. In the case of adding new columns to the dataset, if the user issues an "Edit|Retrain" command, the new fields are selectable.

With respect to models (i.e., MLN, regression, and cluster models) and deleting a column, the user first creates a model that uses "age". "Age" is deleted from the training dataset. The system displays a warning indicating that the column is referenced by other objects (and lists which ones). The user issues a Retrain command. The system warns the user that the required field "age" is missing and (removes it from the model or the retaining fails—it doesn't matter which as long as it is handled smoothly and the user is aware of the problem). The user attempts to score using the original training dataset. The required "age" field is not available so the wizard cannot advance.

With respect to decision trees (or strategy trees) and changing a calculated column, decision trees are more tightly bound to the parent dataset and have a longer more dynamic life cycle than predictive models making handling of changes to the parent dataset more important. The user first imports a file and adds a calculated column. The user creates a decision tree that uses the calculated column. The user returns to the parent dataset and modifies the calculated column by changing the expression. The system warns the user that the column is used by other objects and lists them. The user can choose to proceed or abort. If the user chooses to proceed, the changes to the dataset are committed and the tree is updated as best as possible. Ideally, this would mean removing splits that referenced the changed variable and leaving the tree intact. If necessary, the entire tree can be destroyed or deleted—but the warning should reflect this. This updating process also updates the embedded expressions in the decision (or strategy) tree model ensuring the correct down stream scoring. Deleting a column is a variation of the above.

With respect to decision trees (or strategy trees) and adding a calculated column, the user first imports a file. The user creates a decision tree. The user returns to the parent dataset and adds a calculated column. The system updates the decision tree and detects the new column and applies the same default settings to the one new column that would normally be applied if the tree was being created. The user returns to the decision tree and issues a Find Split command. The system uses the newly added column. Alternatively, the "Tools|Refresh" command described below may be used.

Finally, with respect to changes outside the system, the above workflows assume the changes to the dataset occurs within the system. There are cases when the changes happen outside of the system. Namely, if KSQuery™ or any other scripting environment issues a command to change the dataset, if changes occurred in an earlier version of the software that did not cascade the changes, if a system malfunction occurred and prevented the cascade from happening, and/or if auto-detect is not implemented. In order to handle these circumstances, a "Tools|Refresh" command may be used. The Tools|Refresh command: causes any tree pruning or attribute extensions required based on changes to the dataset and updates any embedded expressions; and, computes and displays warnings if changes would affect a predictive model.

The strategy tree module 170 also includes a strategy tree deployment function. The strategy tree deployment function includes several commands and functions related to deploying strategy trees within an end-user system (e.g., client system 102) in a user-friendly manner. These commands and functions are described in the following.

The data sources command allows a user to specify where the source data for making decisions will come from, integrate a number of models, and prepare a sampled dataset for rule building (or in other words, define a mining view). Associated with the data sources command is a window having fields and buttons for user data entry and selection. An edit button for an external connection field is clicked to select a connection document that will be used to access the source data. Connection documents are typically created by the system administrator (or they may be defined on the fly). An extraction data sources field allows the user to add, edit or remove a data source. Typically a data source corresponds to a series of tables or views in the database. The user can use up and down arrow buttons to order the data sources. With respect to multiple data sources, note that when many sources are listed, the SQL statement issued to the external data system will typically join them. A models field allows the user to specify one or more data mining models to include in the decisioning process. The user can add, edit or remove models.

The client lookup command allows the entry of a customer number in a customer number field and displays the corresponding formatted treatment(s) in a window. The treatment display window thus acts as an integration point with other systems. The uniform resource locator ("URL") specifies all the information required to display the treatments.

Thus, a web services servlet within the data mining system server 101 can serve up presentations for specific customers for presentation to users of client systems 102. With respect to single treatment lookup, an end user can navigate to the server 101 on the web and directly provide the customer ID to receive a suggestion (i.e., a treatment). The treatment is displayed in a window on the display screen 140 of the user's client system 102. With respect to integration with other applications, any application can call the server 101. In this respect, a presentation locator (or strategy or decision design locator) and the customer ID may be provided in the URL. The URL may also contain ID VALUE pairs for the inputs that override the database.

In more detail, in response to a URL, the web servlet accesses HTML or text for treatments. The servlet may support the following query strings: "_DDL_" (i.e., the decision design locator, which is typically required); and, "_ID_" (i.e., the external ID or customer ID that will be used to look up required attributes, which is typically optional). With respect to the customer ID, if it is not provided, then all attributes are required to make the decision must be passed as name value pairs. Any number of name value pairs can be passed. These relate to the attribute names and their associated values that are required to make a decision. Consider the following exemplary URLs. In the following examples, a customer attribute such as a customer ID (e.g., ID=12345) is passed and data source (e.g., mining view) information is used to look-up the required data elements. The first example is a simple URL, the second example is a URL with real-time data, and the third example is a URL that uses only real-time data:

```
http://MyServer:8080/main/delegator?PID=
Presentation&_DDL_=MyDecisionDesignLocator&_ID_=12345
    http://MyServer:8080/main/delegator?PID=
Presentation&_DDL_=MyDecisionDesignLocator&_ID_=
12345&SavingsBalance=10000&TIME_OF_DAY=
13&CHANNEL=CallCenter
    http://MyServer:8080/main/delegator?PID=
Presentation&_DDL_=MyDecisionDesignLocator&SavingsBalance=
10000&TIME_OF_DAY=13&CHANNEL=CallCenter&Gender=
Male&Age=25
```

Figure 13:
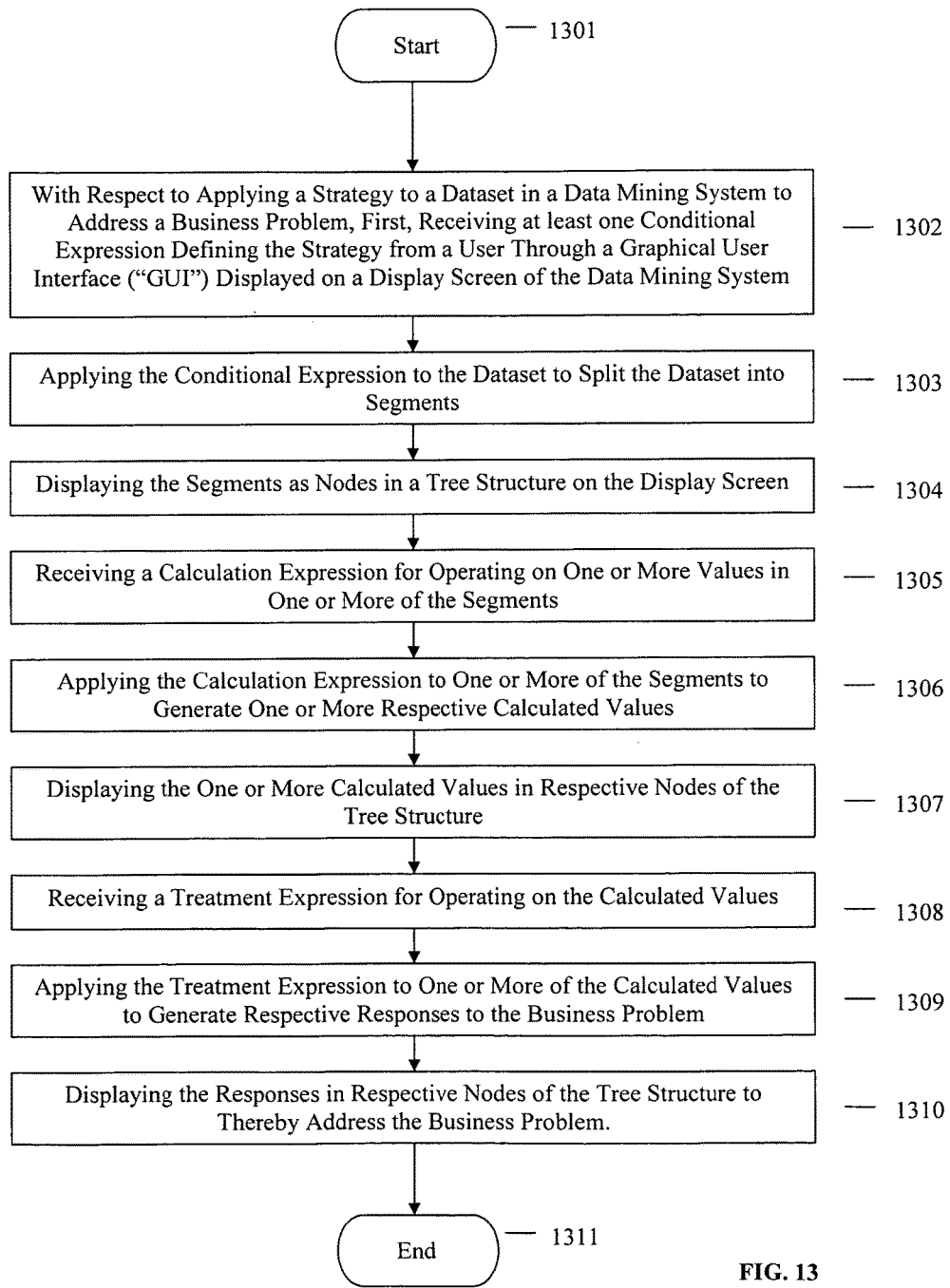

The above described method may summarized (at least partially) with the aid of a flowchart. FIG. 13 is a flow chart illustrating operations 1300 of modules 170 within the memory 130 of a data processing system (e.g., 101) for applying a strategy to a dataset to address a business problem, in accordance with an embodiment of the invention.

At step 1301, the operations 1300 start.

At step 1302, at least one conditional expression 301 defining the strategy is received from a user through a graphical user interface ("GUI") 180 displayed on a display screen 140 of the data processing system 101 (e.g., through the root node splitting options menu 400).

At step 1303, the conditional expression 301 is applied to the dataset to split the dataset into segments.

At step 1304, the segments are displayed as nodes 320, 330 in a tree structure 300 on the display screen 140.

At step 1305, a calculation expression for operating on one or more values in one or more of the segments is received (e.g., through the node calculations dialog box 800 and/or the expression editor 600).

At step 1306, the calculation expression is applied to one or more of the segments to generate one or more respective calculated values (e.g., 701).

At step 1307, the one or more calculated values 701 are displayed in respective nodes of the tree structure (e.g., see "Bad Rate" 701 in nodes 320 and 330 of FIG. 3).

At step 1308, a treatment expression for operating on the calculated values 701 is received (e.g., through the treatment assignment dialog box 800).

At step 1309, the treatment expression is applied to one or more of the calculated values 701 to generate respective responses (e.g., 801) to the business problem.

At step 1310, the responses 801 are displayed in respective nodes of the tree structure to thereby address the business problem (e.g., see "Accept" 801 in node 380 of FIG. 8 and "Do Nothing Until 20 PD" in node 330 of FIG. 3).

At step 1311, the operations 1300 end.

In the above method, the one or more values may include outputs from data mining models (e.g., define mining view with data sources, then build predictive models or cluster models, then extend the mining view (logically or physically) with predictive model or cluster module scores). The conditional, calculation, and treatment expressions may include at least one of logical operators and mathematical operators. The conditional expression may be an IF-THEN-ELSE expression. The GUI 180 may include a respective editor 400, 600, 700, 800 for defining each of the conditional, calculation, and treatment expressions. The method may further include verifying the strategy by applying the calculation expression to segments of a design dataset and a verified dataset to generate respective design calculated values 1201 and verified calculated values 1202 and displaying a comparison 1203 between the design and verified calculated values in respective nodes of the tree structure (e.g., see node 310 of verification tree 1200 in FIG. 12). The conditional expression may include an additional conditional expression 302 for splitting one or more of the segments (e.g., see node 320 in FIG. 3) into one or more sub-segments (e.g., see nodes 340-370 in FIG. 3), the calculation expression may be applied to one or more of the sub-segments to generate respective calculated values for the sub-segments (e.g., see nodes 340-370 in FIG. 3), and the treatment expression may be applied to the calculated values for the sub-segments (e.g., see nodes 340-370 in FIG. 3). The dataset may include one or more columns and the one or more values may be values in the one or more columns. The responses 801, 892 may be text messages. The tree structure 300 may include a root node 310 for the dataset and links (e.g., 301) between the root node 310 and the one or more nodes 320, 330, the links 301 representing splitting of the dataset by the conditional expression to produce the segments. The method may further include deploying the strategy by providing one or more of the segments, calculated values 701, and responses 801 to a client system 102 coupled to the data mining system 101 (e.g., a data mining server system 101) over a network 103 in response to a request from the client system 102. The request may be a uniform resource locator ("URL") (or other protocol) identifying one or more of the strategy and a customer attribute (e.g., customer ID) included in the dataset. The client system 102 may display one or more of the responses 801 on a display screen 140 of the client system 102 to thereby address the business problem (e.g., scoring, etc.) for a customer associated with the customer attribute. The one or more of the segments, calculated values 701, and responses 801 may be included in a document provided by the data mining system 101. The document may be a mark-up language document (e.g., an XML or HTML document). The document may further include one or more of the conditional expression, the calculation expression, and the treatment expression. And, the method may further include accessing information required for determining the segments, calculated values, and responses using one or more of a customer attribute (e.g., age, customer ID, etc.) included in the request and a function of the customer attribute (e.g., age*age).

According to one embodiment, the above method may be performed by the client 102 rather than, or in addition to, the server 101.

The present invention provides several advantages. First, strategy trees provide for the efficient design, deployment, and optimization of business rules (comprising predictive models and user defined constraints) through a decision tree-like interface. Second, the method of the invention combines integration of decision trees, data mining model outputs, user defined thresholds, and profit or value metrics in a single unified authoring environment that is also open for inputs from multiple external sources and that enables management and deployment to multiple target environments. The method combines data mining approaches (e.g., statistical, inference, and visual segmentation trees) with decisioning that targets multiple execution systems. Third, displaying arbitrary aggregate expressions in nodes (segments on the tree or segment report) provides strategy designers with the information they need. Previously, this would have required many complex steps. Fourth, by sorting the segment report, strategy designers can target the most "high gain" areas with specific treatments. For example, in a collections strategy design, the segment report can be sorted by "Dollars at Risk". This isolates the high balance segments which can be assigned the most effective collections treatment. Fifth, showing the distribution of treatments allows strategy designers to work within the resources available. For example, again in a collections strategy, the call center can make only so many outbound calls. The treatment of "Phone Call" can only be assigned to a maximum number of delinquent accounts. Sixth, exposing the results of a strategy as a service to the data mining system 101, 102 eliminates recoding steps (manual or otherwise). Seventh, by linking the strategy design to a mining view definition, the application program interface ("API") to generate a decision need only contain a customer ID. The needed inputs can be looked up based on the provided customer ID and mining view and/or data source definition. Eighth, by coupling a strategy design and presentation design, the API to generate decisions can directly return human readable multi-media presentations. Ninth, by allowing many strategy trees to be associated with a single strategy design, marketers can have overlapping offers. Manually set priorities, cost and profit ratings, or historically derived propensity models can rank the multiple offers on a customer-by-customer basis. Linear programming (e.g., global constraint based optimization) can use this information for list generation. Tenth, by associating treatments with data ranges, offers can automatically be phased in and out of a strategy design. And eleventh, the invention can be implemented in a variety of different platforms and programming languages. It allows for both reduced costs and faster times to create and deploy strategies. Alternate uses or applications for the invention include the following: collections strategies, account management, cross sell—next best offer, and customer acquisition.

While this invention is primarily discussed as a method, a person of ordinary skill in the art will understand that the apparatus discussed above with reference to a data processing system 101, 102, may be programmed to enable the practice of the method of the invention. Moreover, an article of manufacture for use with a data processing system 101, 102, such as a pre-recorded storage device or other similar computer readable medium including program instructions recorded thereon, may direct the data processing system 101, 102 to facilitate the practice of the method of the invention. It is understood that such apparatus and articles of manufacture also come within the scope of the invention.

In particular, the sequences of instructions which when executed cause the method described herein to be performed by the data processing system 101, 102 can be contained in a data carrier product according to one embodiment of the invention. This data carrier product can be loaded into and run by the data processing system 101, 102. In addition, the sequences of instructions which when executed cause the method described herein to be performed by the data processing system 101, 102 can be contained in a computer software product according to one embodiment of the invention. This computer software product can be loaded into and run by the data processing system 101, 102. Moreover, the sequences of instructions which when executed cause the method described herein to be performed by the data processing system 101, 102 can be contained in an integrated circuit product (e.g., hardware modules) including a coprocessor or memory according to one embodiment of the invention. This integrated circuit product can be installed in the data processing system 101, 102.

The embodiments of the invention described above are intended to be exemplary only. Those skilled in the art will understand that various modifications of detail may be made to these embodiments, all of which come within the scope of the invention.

What is claimed is:

1. A method to generate computer code to interact with a dataset in a data mining system, comprising the steps of:

receiving at least one conditional expression from a user through a graphical user interface ("GUI") displayed on a display screen of the data mining system, wherein the at least one conditional expression relates to a plurality of variables from the dataset and, when the at least one conditional expression is applied to the dataset, splits the dataset into segments displayable as nodes in a tree structure, such that the at least one conditional expression splits the dataset into a first group of segments in response to values of a first variable and splits at least one segment of the first group of segments into a second group of segments in response to values of a second variable, wherein the first variable and second variable are different ones of the plurality of variables;

generating by a processor first computer code in response to the at least one conditional expression to apply the at least one conditional expression to the dataset to split the dataset into segments;

displaying the segments as nodes in a tree structure on the display screen;

receiving a calculation expression for operating on one or more values in one or more of the segments;

generating by the processor second computer code in response to the calculation expression to apply the calculation expression to one or more of the segments to generate one or more respective calculated values;

displaying the one or more calculated values in respective nodes of the tree structure;

receiving a treatment expression for operating on the calculated values;

generating by the processor third computer code in response to the treatment expression to apply the treatment expression to one or more of the calculated values to generate respective responses;

displaying the responses in respective nodes of the tree structure to thereby generate a presentation; and, deploying the at least one conditional expression by providing one or more of the segments, calculated values, and responses to a client system coupled to the data mining system over a network in response to a request front the client system; and wherein the request is a uniform resource locator ("URL") identifying one or more of the at least one conditional expression and a customer identification number included in the dataset; and, wherein the steps are performed by a single software application in a single environment.

2. The method of claim 1 wherein the one or more calculated values include outputs from data mining models.

3. The method of claim 1 wherein the conditional, calculation, and treatment expressions include at least one of logical operators and mathematical operators.

4. The method of claim 3 wherein the conditional expression is an IF-THEN-ELSE expression.

5. The method of claim 1 wherein the GUI includes a respective editor for defining each of the conditional, calculation, and treatment expressions and a code generation function to generate the respective first computer code, second computer code and third computer code.

6. The method of claim 1 and further comprising verifying the at least one conditional expression by applying the calculation expression to segments of a design dataset and a verified dataset to generate respective design calculated values and verified calculated values and displaying a comparison between the design and verified calculated values in respective nodes of the tree structure.

7. The method of claim 1 wherein the at least one conditional expression includes a conditional expression for splitting one or more of the segments into one or more sub-segments, wherein the calculation expression is applied to one or more of the sub-segments to generate respective calculated values for the sub-segments, and wherein the treatment expression is applied to the calculated values for the sub-segments.

8. The method of claim 1 wherein the dataset includes one or more columns and the one or more values are values in the one or more columns.

9. The method, of claim 1 wherein the responses are text messages.

10. The method of claim 1 wherein the tree structure includes a root node for the dataset and links between the root node and the one or more nodes, the links representing splitting of the dataset by the conditional expression to produce the segments.

11. The method of claim 1 wherein the client system displays one or more of the responses on a display screen of the client system for a customer associated with the customer attribute.

12. The method of claim 1 wherein the One or more of the segments, calculated values, and responses are included in a document provided by the data mining system.

13. The method of claim 12 wherein the document is a mark-up language document.

14. The method of claim 11 wherein the document further includes one or more of the conditional expression, the calculation expression, and the treatment expression.

15. The method of claim 1 and further comprising accessing information required for determining the segments, calculated values, and responses using one or more of a customer attribute included in the request and a function of the customer attribute.

16. A system for generating a presentation of a dataset, comprising:

a processor coupled to memory, a display screen, and an input device, and configured to:

receive at least one conditional expression from a user through a graphical user interface ("GUI") displayed on the display screen, wherein the at least one conditional expression relates to a plurality of variables from the dataset and, when the at least one conditional expression is applied to the dataset, splits the dataset into segments displayable as nodes in a tree structure, such that the at least one conditional expression splits the dataset into a first group of segments in response to values of a first variable and splits at least one segment of the first group of segments into a second group of segments in response to values of a second variable, wherein the first variable and second variable are different ones of the plurality of variables;

generate, first computer code in response to the at least one conditional expression to apply the at least one conditional expression to the dataset to split the dataset into segments;

display the segments as nodes in a tree structure on the display screen;

receive a calculation expression for operating on one or more values in one or more of the segments;

generate second computer code in response to the calculation expression apply the calculation expression to one or more of the segments to generate one or more respective calculated values;

display the one or more calculated values, in respective nodes of the tree structure;

receive a treatment expression for operating on the calculated values;

generate third computer code in response to the treatment expression to apply the treatment expression to one or more of the calculated values to generate respective responses;

display the responses in respective nodes of the tree structure to thereby generate the presentation; and, deploy the at least one conditional expression by providing one or more of the segments, calculated values, and responses to a client system coupled to the data mining system over a network in response to a request from the client system; and wherein the request is a uniform resource locator ("URL") identifying one or more of the at least one conditional expression and a customer identification number included in the dataset; and wherein the systems is configured by a single software application in a single environment.

17. The system of claim 16 wherein the one or more calculated values include outputs from data mining models.

18. The system of claim 16 wherein the conditional, calculation, and treatment expressions include at least one of logical operators, and mathematical operators.

19. The system of claim 18 wherein the conditional expression is an IF-THEN-ELSE expression.

20. The system of claim 16 wherein the GUI includes a respective editor for defining each of the conditional, calculation, and treatment expressions and a code generation function to generate the respective first computer code, second computer code and third computer code.

21. The system of claim 16 wherein the processor is further configured to verify the at least one conditional expression by applying the calculation expression to segments of a design dataset and a verified dataset to generate respective design calculated values and verified calculated values and display a comparison between the design and verified calculated values in respective nodes of the tree structure.

22. The system of claim 16 wherein the at least one conditional expression includes a conditional expression for splitting one or more of the segments into one or more sub-segments, wherein the calculation expression is applied to one or more of the sub segments to generate respective calculated values for the sub-segments, and wherein the treatment expression is applied to the calculated values for the segments.

23. The system of claim 16 wherein the dataset includes one or more columns and the one or more values are values in the one or columns.

24. The system of claim 16 wherein the responses are text messages.

25. The system of claim 16 wherein the tree structure includes a root node for the dataset and links between the root node and the one or more nodes, the links representing splitting of the dataset by the conditional expression to produce the segments.

26. The system of claim 16 wherein the client system displays one or more of the responses on a display screen of the client system for a customer associated with the customer identification number.

27. The system of claim 16 wherein the one or more of the segments, calculated values, and responses are included in a document provided by the data mining system.

28. The system of claim 27 wherein the document is a mark-up language document.

29. The system of claim 28 wherein the document further includes one or more of the conditional expression, the calculation expression, and the treatment expression.

30. The system of claim 16 wherein the processor is further configured to access information required for determining the segments, calculated values, and responses using one or more of a customer attribute included in the request and a function of the customer attribute.

* * * * *